US012708062B2

(12) United States Patent
Beaujot et al.

(10) Patent No.: US 12,708,062 B2
(45) Date of Patent: Aug. 18, 2026

(54) IMPLEMENT OPERATING APPARATUS AND METHODS FOR SAME

(71) Applicant: Raven Industries, Inc., Sioux Falls, SD (US)

(72) Inventors: Norbert Beaujot, Emerald Park (CA); Brian Hyronimus, Tea, SD (US); Thomas C. Obermark, Minneapolis, MN (US)

(73) Assignee: Raven Industries, Inc., Sioux Falls, SD (US)

( * ) Notice: Subject to any disclaimer, the term of this patent is extended or adjusted under 35 U.S.C. 154(b) by 417 days.

(21) Appl. No.: 18/330,982

(22) Filed: Jun. 7, 2023

(65) Prior Publication Data

US 2023/0389457 A1 Dec. 7, 2023

Related U.S. Application Data

(60) Provisional application No. 63/349,991, filed on Jun. 7, 2022.

(51) Int. Cl.
*A01B 59/06* (2006.01)

(52) U.S. Cl.
CPC .................................... *A01B 59/06* (2013.01)

(58) Field of Classification Search
CPC ............................................. A01B 59/06–065
See application file for complete search history.

(56) References Cited

U.S. PATENT DOCUMENTS 2,696,928 A * 12/1954 Faircloth et al. ......... B62B 3/12 414/469
3,462,199 A 8/1969 Harris et al.
(Continued)

FOREIGN PATENT DOCUMENTS

AU 2017220488 A1 9/2018
AU 2021225237 B2 10/2023
(Continued)

OTHER PUBLICATIONS

"Canadian Application Serial No. 2,955,638, Response filed May 22, 2024 to Examiners Rule 86(2) Report mailed Jan. 22, 2024", 10 pgs.

(Continued)

*Primary Examiner* — Tara Mayo
(74) *Attorney, Agent, or Firm* — Schwegman Lundberg & Woessner, P.A.

(57) ABSTRACT

An implement operating apparatus includes an adjustable frame configured for coupling with an agricultural implement. The adjustable frame includes first and second component frame members movable relative to each other. An adjustable implement socket is configured to receive and couple with the agricultural implement. A plurality of ground engaging elements are coupled with the first or second component frame members. A conversion assembly is coupled between the first and second component frame members. The conversion assembly includes a conversion actuator coupled between the first and second component frame members. The conversion assembly is configured to transition the first and second component frame members between a plurality of frame profiles having specified element spacings between the ground engaging elements of the plurality.

27 Claims, 18 Drawing Sheets

(56) References Cited

U.S. PATENT DOCUMENTS

| | | | | |
|---|---|---|---|---|
| 3,472,322 | A | 10/1969 | Barry | |
| 3,645,074 | A | 2/1972 | Rettig et al. | |
| 3,677,572 | A | 7/1972 | Fontan et al. | |
| 3,757,976 | A | 9/1973 | Van Der Lely | |
| 3,985,185 | A * | 10/1976 | Pierce | A01B 33/16 172/123 |
| 4,036,377 | A | 7/1977 | Weber | |
| 4,060,259 | A | 11/1977 | Mefferd et al. | |
| 4,260,172 | A | 4/1981 | Rettig et al. | |
| 4,271,919 | A | 6/1981 | Vaughan | |
| 4,351,428 | A | 9/1982 | Long | |
| 4,359,117 | A | 11/1982 | Vaughan | |
| 4,367,814 | A | 1/1983 | Young | |
| 4,440,539 | A | 4/1984 | Sullivan | |
| 4,566,553 | A | 1/1986 | Mccutcheon | |
| 4,603,775 | A | 8/1986 | Plett | |
| 4,650,058 | A | 3/1987 | Vaughan | |
| 4,683,969 | A | 8/1987 | Littau | |
| 4,714,149 | A | 12/1987 | Tiede | |
| 4,958,978 | A * | 9/1990 | Shedleski | B62D 53/028 280/789 |
| 4,963,066 | A | 10/1990 | Boppart | |
| 5,092,422 | A | 3/1992 | Hood, Jr. et al. | |
| 5,316,338 | A | 5/1994 | Wolf et al. | |
| 5,318,444 | A | 6/1994 | Kuzub et al. | |
| 6,213,218 | B1 | 4/2001 | Miller | |
| 6,308,785 | B1 * | 10/2001 | Rhoden | A01B 63/22 172/393 |
| 6,321,852 | B1 | 11/2001 | Pratt | |
| 6,671,582 | B1 | 12/2003 | Hanley | |
| 7,191,889 | B1 | 3/2007 | Heley | |
| 7,488,149 | B2 | 2/2009 | Waldner | |
| 7,549,279 | B2 | 6/2009 | Merant et al. | |
| 7,708,131 | B2 | 5/2010 | Muth | |
| 7,793,770 | B1 | 9/2010 | Schoonover et al. | |
| 7,866,456 | B2 | 1/2011 | Bauman et al. | |
| 8,118,151 | B1 | 2/2012 | Jesse | |
| 8,180,534 | B2 | 5/2012 | Burke et al. | |
| 8,272,493 | B1 | 9/2012 | Grengs | |
| 8,312,957 | B1 | 11/2012 | Stoltzfus | |
| 8,365,896 | B2 | 2/2013 | Jesse | |
| 8,396,632 | B2 | 3/2013 | Burke et al. | |
| 8,515,594 | B2 | 8/2013 | Perry et al. | |
| 8,534,982 | B2 | 9/2013 | Brainard et al. | |
| 8,584,827 | B1 | 11/2013 | Jesse | |
| 9,145,264 | B2 | 9/2015 | Houssian et al. | |
| 9,533,612 | B2 | 1/2017 | Meenen et al. | |
| 9,596,808 | B2 | 3/2017 | Fay, II et al. | |
| 9,855,876 | B2 | 1/2018 | Affleck | |
| 9,932,178 | B2 | 4/2018 | Allensworth et al. | |
| 10,368,473 | B2 | 8/2019 | Treinen et al. | |
| 10,407,248 | B2 | 9/2019 | Rempel et al. | |
| 10,443,251 | B2 | 10/2019 | Eenigenburg et al. | |
| 10,550,694 | B2 | 2/2020 | Watson et al. | |
| 10,556,751 | B2 | 2/2020 | Peutert et al. | |
| 10,750,652 | B2 | 8/2020 | Beaujot | |
| 10,752,149 | B2 | 8/2020 | Beaujot | |
| 10,961,728 | B2 | 3/2021 | Eenigenburg et al. | |
| 11,382,253 | B2 | 7/2022 | Beaujot | |
| 11,427,120 | B2 | 8/2022 | Beaujot | |
| 11,812,678 | B2 | 11/2023 | Beaujot | |
| 11,872,924 | B2 | 1/2024 | Beaujot | |
| 2007/0157592 | A1 | 7/2007 | Merant et al. | |
| 2007/0168095 | A1 | 7/2007 | Wierzba et al. | |
| 2011/0148053 | A1 | 6/2011 | Motebennur et al. | |
| 2013/0288692 | A1 | 10/2013 | Dupray et al. | |
| 2014/0048381 | A1 | 2/2014 | Smith et al. | |
| 2014/0216314 | A1 | 8/2014 | Bourgault et al. | |
| 2015/0237803 | A1 | 8/2015 | Hilvers et al. | |
| 2016/0244268 | A1 | 8/2016 | Ritter | |
| 2017/0227969 | A1 | 8/2017 | Murray et al. | |
| 2017/0297471 | A1 | 10/2017 | Beaujot | |
| 2018/0153084 | A1 | 6/2018 | Calleija et al. | |
| 2019/0053417 | A1 | 2/2019 | Beaujot | |
| 2019/0210807 | A1 | 7/2019 | Kornelsen et al. | |
| 2019/0232852 | A1 * | 8/2019 | Beaujot | A01B 73/00 |
| 2019/0308830 | A1 | 10/2019 | Quist | |
| 2021/0051835 | A1 | 2/2021 | Beaujot | |
| 2021/0070211 | A1 | 3/2021 | Beaujot | |
| 2021/0185874 | A1 | 6/2021 | Beaujot | |
| 2021/0245821 | A1 | 8/2021 | Crouzat | |
| 2022/0287214 | A1 | 9/2022 | Beaujot | |
| 2023/0008407 | A1 | 1/2023 | Beaujot | |
| 2023/0070398 | A1 | 3/2023 | Beaujot | |

FOREIGN PATENT DOCUMENTS

| | | | |
|---|---|---|---|
| CA | 2921130 | A1 | 9/2016 |
| CA | 2921130 | C | 5/2017 |
| CA | 2927582 | A1 | 10/2017 |
| CA | 2964610 | A1 | 10/2017 |
| CA | 2955638 | A1 | 7/2018 |
| CA | 3052153 | A1 | 2/2021 |
| CA | 2964610 | C | 8/2022 |
| CA | 2927582 | C | 1/2024 |
| CN | 202573706 | U | 12/2012 |
| CN | 109068577 | A | 12/2018 |
| DE | 29714523 | U1 | 10/1997 |
| EA | 201891745 | A1 | 2/2019 |
| EP | 1008284 | A2 | 6/2000 |
| EP | 1319587 | A1 | 6/2003 |
| EP | 1369007 | A1 | 12/2003 |
| EP | 3416469 | A1 | 12/2018 |
| EP | 3868190 | A1 | 8/2021 |
| EP | 4014100 | | 1/2024 |
| ES | 1265465 | | 4/2021 |
| FR | 2678888 | | 1/1993 |
| IN | 201827034406 | A | 2/2019 |
| JP | 2008001273 | A | 1/2008 |
| JP | 4553267 | B1 | 9/2010 |
| JP | 2010279342 | A | 12/2010 |
| JP | 2019510684 | A | 4/2019 |
| WO | WO-9609950 | A1 | 4/1996 |
| WO | WO-2017139892 | A1 | 8/2017 |
| WO | WO-2021030904 | A1 | 2/2021 |
| WO | WO-2023239807 | A1 | 12/2023 |

OTHER PUBLICATIONS

"European Application Serial No. 21161445.8, Communication Pursuant to Article 94(3) EPC mailed Jun. 27, 2024", 5 pgs.

"U.S. Appl. No. 17/844,910, Non Final Office Action mailed Jul. 16, 2024", 17 pgs.

"European Application Serial No. 20855699.3, Response filed Aug. 1, 2024 to Extended European Search Report mailed Dec. 12, 2023", 20 pgs.

"Canadian Application Serial No. 3,052,153, Examiners Rule 86(2) Report mailed Jul. 29, 2024", 3 pgs.

"U.S. Appl. No. 17/844,910, Response filed Oct. 16, 2024 to Non Final Office Action mailed Jul. 16, 2024", 19 pgs.

"International Application Serial No. PCT US2023 024739, International Preliminary Report on Patentability mailed Dec. 19, 2024", 11 pgs.

"U.S. Appl. No. 17/844,910, Notice of Allowance mailed Dec. 26, 2024", 5 pgs.

"U.S. Appl. No. 17/635,668, Restriction Requirement mailed Feb. 4, 2025", 5 pgs.

"Canadian Application Serial No. 3,052,153, Response filed Jan. 22, 2025 to Examiners Rule 86(2) Report mailed Jul. 29, 2", (18 pgs).

"Australian Application Serial No. 2020334396, First Examination Report mailed Feb. 18, 2025", 3 pgs.

U.S. Appl. No. 17/635,668, Response filed Apr. 4, 2025 to Restriction Requirement mailed Feb. 4, 2025, 13 pgs.

"U.S. Appl. No. 15/490,027, Final Office Action mailed Jan. 14, 2019", 8 pgs.

"U.S. Appl. No. 15/490,027, Non Final Office Action mailed Aug. 9, 2018", 8 pgs.

"U.S. Appl. No. 15/490,027, Response filed Jun. 4, 2018 to Restriction Requirement mailed Apr. 5, 2018", 1 pg.

(56) References Cited

OTHER PUBLICATIONS

"U.S. Appl. No. 15/490,027, Response filed Nov. 9, 2018 to Non Final Office Action mailed Aug. 9, 2018", 6 pgs.
"U.S. Appl. No. 15/490,027, Restriction Requirement mailed Apr. 5, 2018", 6 pgs.
"U.S. Appl. No. 16/077,775, Notice of Allowance mailed Apr. 15, 2020", 6 pgs.
"U.S. Appl. No. 16/077,775, Preliminary Amendment filed Aug. 14, 2018", 14 pgs.
"U.S. Appl. No. 16/077,775, Supplemental Notice of Allowability mailed Jun. 12, 2020", 2 pgs.
"U.S. Appl. No. 16/381,201, Notice of Allowance mailed Apr. 22, 2020", 9 pgs.
"U.S. Appl. No. 16/381,201, Preliminary Amendment filed Apr. 11, 2019", 11 pgs.
"U.S. Appl. No. 16/929,814, Non Final Office Action mailed Oct. 6, 2021", 10 pgs.
"U.S. Appl. No. 16/929,814, Notice of Allowance mailed Mar. 11, 2022", 5 pgs.
"U.S. Appl. No. 16/929,814, Preliminary Amendment filed Nov. 12, 2020", 10 pgs.
"U.S. Appl. No. 16/929,814, Response filed Jan. 6, 2022 to Non Final Office Action mailed Oct. 6, 2021", 18 pgs.
"U.S. Appl. No. 16/935,606, Non Final Office Action mailed Jul. 7, 2021", 9 pgs.
"U.S. Appl. No. 16/935,606, Notice of Allowance mailed Jan. 21, 2022", 5 pgs.
"U.S. Appl. No. 16/935,606, Notice of Allowance mailed Apr. 26, 2022", 5 pgs.
"U.S. Appl. No. 16/935,606, Preliminary Amendment filed Nov. 30, 2020", 8 pgs.
"U.S. Appl. No. 16/935,606, Response filed Nov. 2, 2021 to Non Final Office Action mailed Jul. 7, 2021", 12 pgs.
"U.S. Appl. No. 17/190,877, Corrected Notice of Allowability mailed Oct. 13, 2023", 5 pgs.
"U.S. Appl. No. 17/190,877, Corrected Notice of Allowability mailed Jul. 6, 2023", 2 pgs.
"U.S. Appl. No. 17/190,877, Corrected Notice of Allowability mailed Aug. 10, 2023", 2 pgs.
"U.S. Appl. No. 17/190,877, Notice of Allowability mailed Aug. 30, 2023", 2 pgs.
"U.S. Appl. No. 17/190,877, Notice of Allowance mailed Jun. 23, 2023", 8 pgs.
"U.S. Appl. No. 17/190,877, Preliminary Amendment filed Mar. 3, 2021", 8 pgs.
"U.S. Appl. No. 17/812,553 Supplemental Preliminary Amendment Filed Sep. 27, 2022", 6 pgs.
"U.S. Appl. No. 17/812,553, Corrected Notice of Allowability mailed Dec. 8, 2023", 2 pgs.
"U.S. Appl. No. 17/812,553, Non Final Office Action mailed Apr. 21, 2023", 9 pgs.
"U.S. Appl. No. 17/812,553, Notice of Allowance mailed Sep. 6, 2023", 5 pgs.
"U.S. Appl. No. 17/812,553, Response filed Jul. 11, 2023 to Non Final Office Action mailed Apr. 21, 2023", 10 pgs.
"U.S. Appl. No. 17/844,910, Preliminary Amendment filed Nov. 29, 2022", 8 pgs.
"Australian Application Serial No. 2017220488, First Examination Report mailed May 13, 2021", 4 pgs.
"Australian Application Serial No. 2017220488, Response filed Aug. 31, 2021 to First Examination Report mailed May 13, 2021", 17 pgs.
"Australian Application Serial No. 2021225237, First Examination Report mailed Jun. 14, 2023", 4 pgs.
"Australian Application Serial No. 2021225237, Response filed Sep. 13, 2023 to First Examination Report mailed Jun. 14, 2023", 7 pgs.
"Brazilian Application Serial No. 11201801675-1, Voluntary Amendment filed Dec. 5, 2019", with machine translation, 137 pgs.
"Brazilian Application Serial No. 112018016785-1, Office Action mailed Jun. 24, 2021", w/English Translation, 5 pgs.
"Brazilian Application Serial No. 112018016785-1, Response filed Sep. 27, 2021 to Office Action mailed Jun. 24, 2021", w/ English translation, 146 pgs.
"Canadian Application Serial No. 2,921,130, Office Action mailed Oct. 26, 2016", 3 pgs.
"Canadian Application Serial No. 2,921,130, Response filed Nov. 17, 2016 to Office Action mailed Oct. 26, 2016", 9 pgs.
"Canadian Application Serial No. 2,927,582, Examiners Rule 86(2) Report mailed Jan. 24, 2023", 5 pgs.
"Canadian Application Serial No. 2,927,582, Office Action mailed Jun. 29, 2021", 11 pgs.
"Canadian Application Serial No. 2,927,582, Response filed Oct. 27, 2021 Office Action mailed Jun. 29, 2021", 28 pgs.
"Canadian Application Serial No. 2,927,582, Response filed Apr. 21, 2023 to Examiners Rule 86(2) Report mailed Jan. 24, 2023", 9 pgs.
"Canadian Application Serial No. 2,955,638, Examiner's Report mailed Jan. 25, 2023", 5 pgs.
"Canadian Application Serial No. 2,955,638, Examiners Rule 86(2) Report mailed Jan. 22, 2024", 3 pgs.
"Canadian Application Serial No. 2,955,638, Response filed May 25, 2023 to Examiner's Report mailed Jan. 25, 2023", 12 pgs.
"Canadian Application Serial No. 2,964,610, Office Action mailed May 27, 2021", 4 pgs.
"Canadian Application Serial No. 2,964,610, Response filed Sep. 27, 2021 to Office Action mailed May 27, 2021", 12 pgs.
"Canadian Application Serial No. 3,052,153, Examiners Rule 86(2) Report mailed Sep. 21, 2023", 3 pgs.
"Canadian Application Serial No. 3,052,153, Response filed Jan. 19, 2024 to Examiners Rule 86(2) Report mailed Sep. 21, 2023", 17 pgs.
"Chinese Application Serial No. 201780023300.3, Office Action mailed Feb. 2, 2021", with machine translation, 34 pgs.
"Eurasian Application Serial No. 201891745, Office Action mailed Nov. 29, 2019", with English claims, 10 pgs.
"Eurasian Application Serial No. 201891745, Response filed Feb. 14, 2020 to Office Action mailed Nov. 29, 2019", w/English Claims, 25 pgs.
"European Application Serial No. 17752606.8, Extended European Search Report mailed Sep. 23, 2019", 7 pgs.
"European Application Serial No. 17752606.8, Response filed Sep. 28, 2018 to Communication Pursuant to Rules 161(1) and 162 EPC mailed Sep. 25, 2018", 92 pgs.
"European Application Serial No. 17752606.8, Response filed Dec. 4, 2019 to Extended European Search Report mailed Sep. 23, 2019", 92 pgs.
"European Application Serial No. 20855699.3, Communication Pursuant to Article 94(3) EPC mailed Aug. 4, 2023", 15 pgs.
"European Application Serial No. 20855699.3, Extended European Search Report mailed Dec. 12, 2023", 13 pgs.
"European Application Serial No. 20855699.3, Response to Communication pursuant to Rules 161(2) and 162 EPC filed Sep. 30, 2022", 39 pgs.
"European Application Serial No. 21161445.8, Extended European Search Report mailed Jun. 28, 2021", 7 pgs.
"Indian Application Serial No. 201827034406, Examination Report mailed Dec. 28, 2020", with English translation, 7 pgs.
"International Application Serial No. PCT/CA2017/050202, International Preliminary Report on Patentability mailed Aug. 30, 2018", 6 pgs.
"International Application Serial No. PCT/CA2017/050202, International Search Report mailed May 19, 2017", 4 pgs.
"International Application Serial No. PCT/CA2017/050202, Invitation to Pay Additional Fees mailed Mar. 7, 2017", 2 pgs.
"International Application Serial No. PCT/CA2017/050202, Written Opinion mailed May 19, 2017", 4 pgs.
"International Application Serial No. PCT/CA2020/051122, International Search Report mailed Oct. 9, 2020", 3 pgs.
"International Application Serial No. PCT/CA2020/051122, International Written Opinion mailed Oct. 9, 2020", 5 pgs.

(56) References Cited

OTHER PUBLICATIONS

"International Application Serial No. PCT/US2023/024739, International Search Report mailed Sep. 1, 2023", 2 pgs.
"International Application Serial No. PCT/US2023/024739, Written Opinion mailed Sep. 1, 2023", 9 pgs.
"Japanese Application Serial No. 2018-562394, Notification of Reasons for Refusal mailed Nov. 13, 2020", with machine translation, 10 pgs.
"Japanese Application Serial No. 2018-562394, Response filed Apr. 12, 2012 to Notification of Reasons for Refusal mailed Nov. 13, 2020", w/ English claims, 26 pgs.
Beaujot, Norbert, "Agricultural implement and ramp attachment system", U.S. Appl. No. 15/490,027, filed Apr. 18, 2017, (Apr. 18, 2017), 28 pgs.
"U.S. Appl. No. 17/635,668, Non Final Office Action mailed Aug. 5, 2025", 11 pgs.
"U.S. Appl. No. 17/635,668, Response filed Jan. 5, 2026 to Non Final Office Action mailed Aug. 5, 2025", 15 pgs.
"Brazil Application Serial No. BR112022002826-1, Office Action mailed Oct. 9, 2025", with manual English translation, 7 pages.
"European Application Serial No. 21833446.4, Response to Communication Pursuant to Rules 161 and 162 EPC filed Jul. 14, 2025", 19 pgs.
"Australian Application Serial No. 2020334396, Response filed Feb. 11, 2026 to First Examination Report mailed Feb. 18, 2025", 79 pgs.
"Australian Application Serial No. 2020334396, Subsequent Examination Report mailed Feb. 12, 2026", 3 pgs.
"Australian Application Serial No. 2020334396, Response filed Feb. 17, 2026 to Subsequent Examination Report mailed Feb. 12, 2026", 72 pgs.
"U.S. Appl. No. 17/635,668, Notice of Allowance mailed Mar. 19, 2026", 5 pgs.
"U.S. Appl. No. 17/635,668, Corrected Notice of Allowability mailed Mar. 31, 2026", 2 pgs.
"European Application Serial No. 23820418.4, Communication pursuant to Rule 1641 EPC mailed May 11, 2026", 13 pages.
"European Application Serial No. 21161445.8, Communication Pursuant to Article 943 EPC mailed May 28, 2026", 6 pages.
"U.S. Appl. No. 17/635,668, Corrected Notice of Allowability mailed Jun. 23, 2026", 2 pages.
"Canadian Application Serial No. 3,052,153, Office Action mailed Jun. 10, 2026", 5 pages.

* cited by examiner

IMPLEMENT OPERATING APPARATUS AND METHODS FOR SAME

CLAIM OF PRIORITY

This patent application claims the benefit of priority Beaujot et al., U.S. Provisional Patent Application Ser. No. 63/349,991, entitled "IMPLEMENT OPERATING APPARATUS AND METHODS FOR SAME," filed on Jun. 7, 2022, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright, Raven Industries, Inc. of Sioux Falls, South Dakota, USA. All Rights Reserved.

TECHNICAL FIELD

This document pertains generally, but not by way of limitation, to agricultural vehicles and implements.

BACKGROUND

Agricultural vehicles and implements are used in combination to perform one or more agricultural tasks, for instance, planting, seeding, spraying, spreading, harvesting, mowing or transporting of crops. In some examples, agricultural vehicles, such as tractors, couple with agricultural implements with hitches (e.g., three point hitches, draw bars or the like) to pull the implement through a field as the implement conducts the agricultural task.

In another examples, agricultural vehicles and implements are consolidated. For instance, harvesters (combines) include multiple implements configured to harvest (cut), thresh, separate, clean and collect the harvested crop. In still other examples, the agricultural vehicle includes a hook, lift or the like configured to couple with a separate implement and pull the implement onto a bed or surface of the vehicle in a manner similar to a haul-away dumpster or hauler.

SUMMARY

The present inventors have recognized, among other things, that a problem to be solved can include enhancing an agricultural vehicle to work within fields having differing crop row spacing and at the same time readily couple with and operate a variety of agricultural implements having one or more of different implement profiles (e.g., sizes, shapes or the like) and different interfaces including, but not limited to, power specifications (e.g., mechanical, hydraulic, electrical, pneumatic) or control specifications (e.g., electrical, data, hydraulic or the like).

For example, agricultural implements have varying implement profiles to accommodate planting, husbandry (spraying, cultivating or the like) or harvesting to specified numbers of crop rows, specified crop row spacing, or the like. Spray nozzles, row units, harvesting tools or the like are provided along the implement at specified locations corresponding to crop row spacing, often dependent on the crop, soil conditions or the like. Additionally, implements may have various sizes (another example of an implement profile) to conduct agricultural tasks on various sizes of swaths (e.g., 12, 24, 64 crop rows, swath widths or the like). Additionally, agricultural vehicles include ground engaging elements, such as wheels, tracks or the like, that are positioned according to crop row spacing. The use of an improperly dimensioned vehicle or implement may, in various examples, cause misapplication of agricultural products (e.g., to the space between rows), cultivation and damage of crop rows instead of the gaps between crop rows, crushing of crops by ground engaging elements or the like.

In some examples, it is difficult at best and sometimes impossible, to adjust implements or agricultural vehicles to conduct agricultural operations to varying swath sizes, crop row spacings or the like. Instead, varied agricultural vehicles, varied implements or the like (statically configured for different swath sizes, crop row spacings or the like) are required to conduct operations without misconduct or damage to crops. Using multiple agricultural vehicles, multiple agricultural implements, or the like to address variations in crop row spacing, variations to the specifications of various agricultural operations or the like is laborious and expensive.

In other examples, for instance with some automated agricultural vehicles coupling with various implements is at times conducted. The implements may have a consistent implement profile to couple with a feature of the agricultural vehicle, such as a platform, housing or the like that accepts those implements (e.g., having a complementary vehicle profile of dimensions, coupling features or the like). In some examples, the automated agricultural vehicle is not readily configured to couple with larger (or smaller) implements that have an implement profile different than the consistent profile used with the vehicle. Accordingly, implements that provide enhanced or different functionality, agricultural operations or the like with associated different implement profiles are incompatible with the automated agricultural vehicle.

Additionally, the automated agricultural vehicle includes ground engaging elements, such as treads or wheels, that are configured for a specified crop row spacing. Accordingly, even with a capability to use various implements having an acceptable implement profile with associated automated agricultural vehicles, the automated agricultural vehicles may cause damage to crops having a crop row spacing that does not comport with the spacing between the ground engaging elements for the vehicles.

The present subject matter can help provide a solution to these problems with an implement operating apparatus that provides one or both of an adjustable implement socket or an adjustable frame that are reconfigurable with a conversion assembly. In one example, the adjustable implement socket includes one or more frame members coupled with the conversion assembly. The conversion assembly includes a base member (e.g., component of the frame, anchor or the like), a conversion member (e.g., another frame component, anchor or the like) and a conversion actuator. The conversion actuator moves the conversion member relative to the base member and correspondingly moves associated components of the implement operating apparatus, such as component frame members. The conversion assembly thereby converts (e.g., transforms, adjusts, changes or the like) the adjustable implement socket to one or more socket profiles configured to couple with corresponding agricultural implements having implement profiles complementary to the socket profiles.

In another example, the conversion assembly is coupled with first and second component frame members of the adjustable frame. Each of the first and second component frame members includes one or more ground engaging elements, such as wheels, tracks or the like. The conversion assembly including the conversion actuator is coupled with the first and second component frame members.

In one example, the base member and the conversion member are each associated with one of the first or second frame members. In another example, the base member is provided with a base frame member interposed between the first and second component frame members, and the conversion member is associated with one of the first or second component frame members. Operation of the conversion actuator moves the first and second component frame members and correspondingly moves the associated ground engaging elements. In one example, the conversion assembly moves the adjustable frame between plural frame profiles each having different specified element spacings between ground engaging elements (e.g., to comport with varied crop row spacing).

The implement operating apparatus described herein, provides a platform configured to convert (e.g., transform, adjust, change or the like) an agricultural vehicle into various configurations to work within a plurality of fields having various crop row spacings. Additionally, the implement operating apparatus is, in another example, configured to transform an adjustable implement socket between various socket profiles to facilitate coupling and operation of agricultural implements with different implement profiles. In other examples, and as described herein, the conversion assembly including the conversion actuator (e.g., one or more conversion actuators) controls conversion of the implement operating apparatus including one or both of the adjustable implement socket or the adjustable frame and associated ground engaging elements between various profiles to facilitate operation in a variety of fields (e.g., with different crop row spacings) and with a variety of agricultural implements having different implement profiles. The different implement profiles provide flexibility in agricultural operations including conducting operations with different crop row spacings, different numbers of crop rows or larger swaths, and the use of agricultural implements having varied profiles (e.g., sizes, shapes or the like).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
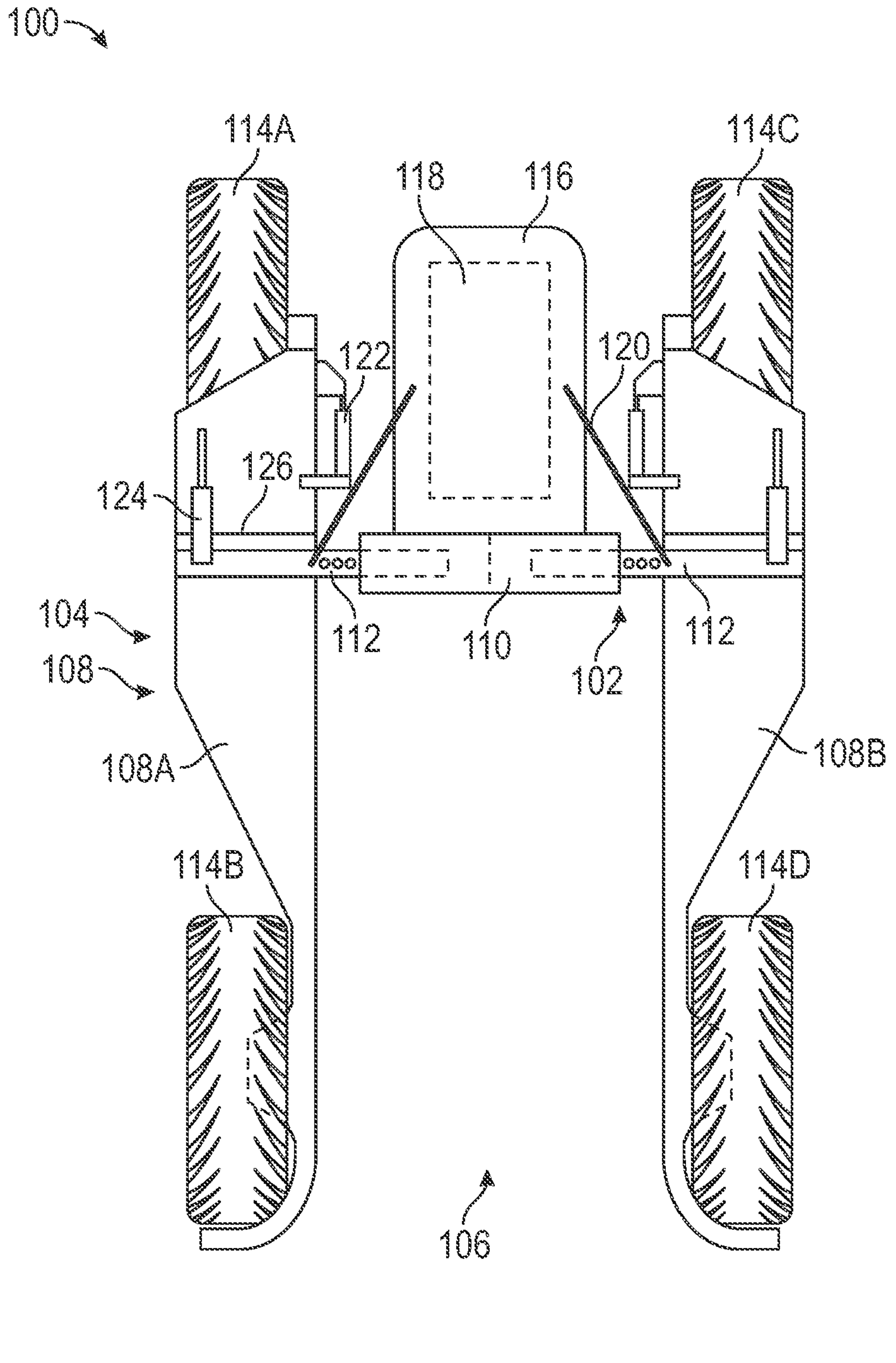
FIG. 1 is a plan view of one example of an implement operating apparatus including a conversion assembly.

FIG. 1 is a plan view of one example of an implement operating apparatus 100 including a conversion assembly 102. The conversion assembly 102 facilitates adjustment of the implement operating apparatus 100. The implement operating apparatus 100 includes a frame 104. The frame 104 at least partially surrounds an adjustable implement socket 106. The adjustable implement socket 106 is configurable using the conversion assembly 102. In an example, the conversion assembly 102 reconfigures the adjustable implement socket 106 to accommodate one or more implements having varying implement profiles. For instance, the conversion assembly 102 adjusts the width, depth, or the like of the adjustable implement socket 106 to accommodate implements having varying implement profiles. Accordingly, dimensions, area, volume, or the like of the adjustable implement socket 106 are changed based on operation of the conversion assembly 102 to reconfigure the adjustable implement socket 106.

In an example, the frame 104 includes one or more component frame members 108, for instance a first component frame member 108A and a second component frame member 108B. The component frame members 108 are moveable using the conversion assembly 102 to adjust the frame 104. For example, the component frame members 108 are moveable relative to a base frame member 110 with the conversion assembly 102. In another example, the conversion assembly 102 is interposed between the base frame member 110 and the component frame members 108. The conversion assembly 102 moves the component frame members 108 relative to the base frame member 110, for instance to configure the implement socket 106 to different dimensions, areas, volumes or the like (e.g., profiles).

In another example, the conversion assembly 102 includes one or more conversion members 112. In this example, the conversion members 112 are moved relative to a base member of the conversion assembly 102. For example, the conversion assembly 102 moves the conversion members 112 with respect to the base frame member 110. Thus, in some examples, the conversion assembly 102 includes the base frame member 110. In a further example, the conversion members 112 are coupled with the component frame members 108, and movement of the conversion members 112 correspondingly moves the component frame members 108 with respect to the base frame member 110. Accordingly, the conversion assembly 102 moves the component frame members 108 to configure the adjustable implement socket 106 to one or more profiles.

The implement operating apparatus 100 includes one or more ground engaging elements 114. For example, the ground engaging elements 114 facilitate movement of the implement operating apparatus 100 along a surface (e.g., an agricultural field). In an example, the one or more ground engaging elements 114 include, but are not limited to, wheels, tires, treads, tracks, runners or the like coupled with frame 104 (e.g., coupled with the component frame members 108, or the like). The implement operating apparatus 100 further includes one or more motors, power sources or the like (e.g., electric, combustion, hydraulic or the like) operatively coupled with the ground engaging elements 114 to conduct movement of the apparatus.

In one example, the first component frame member 108A includes a first ground engaging element 114A and a second ground engaging element 114B. The second component frame member 108B includes a third ground engaging element 114C and a fourth ground engaging element 114D. As described herein, as the conversion assembly 102 configures the component frame members 108A, B the associated ground engaging elements 114A-D are correspondingly positioned, for instance to space the ground engaging elements in a manner consistent with crop row spacing (e.g., to minimize overrunning of crops). For instance, the conversion assembly 102 adjusts spacing between the one or more ground engaging elements 114 to correspond with crop row spacing (including multiples of crop row spacing) and permit operation of the implement operating apparatus with the ground engaging elements between crop rows. The correspondence between the spacing of the one or more ground engaging elements 114 and the crop row spacing (including multiples of the spacing) decreases crop damage by the ground engaging elements 114 and at the same time facilitates the apparatus 100 operation within a variety of different crop row spacings.

As shown in FIG. 1, the implement operating apparatus 100 in this example includes a carriage 116. The carriage 116 is optionally coupled with the base frame member 110 and extends from the base frame member 110. In an example, the carriage 116 supports a power source 118 for the implement operating apparatus 100. For example, the power source includes, but is not limited to, a battery, fuel reservoir, motor (e.g., internal combustion engine, hydraulic, pneumatic, electric, or the like), battery and motor, generator, or the like. The power source 118 provides one or more of mechanical, electrical, hydraulic, or pneumatic power to the implement operating apparatus 100. For instance, the power source 118 is operatively coupled with the one or more ground engaging elements 114, and provides power to the elements 114 for moving the implement operating apparatus 100 through an agricultural field.

Referring again to FIG. 1, the carriage 116 is shown with an optional carriage tether 120 coupled between the frame 104 and the carriage. The one or more carriage tethers 120 facilitates support of the carriage 116. As described herein, the carriage tethers 120 are optionally loaded in tension with the conversion assembly 102 to enhance support of the carriage. In one example, the one or more carriage tethers 120 extend between the carriage 116 and the conversion members 112. In another example, the one or more carriage tethers 120 extend between the carriage 116 and the base frame member 110.

As discussed, the one or more carriage tethers 120 support the carriage 116 in addition to coupling of the carriage 116 with the remainder of the frame (e.g., with the base frame member 110, as shown in FIG. 1. In this example, the carriage tethers extend from an elevated location coupled to the component frame members 108A, B to a lower location coupled with the carriage 116. As described herein, the conversion assembly 102 includes one or more actuators, motors or the like to implement modifications to the frame 104 (e.g., expansion, contraction or the like). In another example, the conversion assembly 102 and its actuators, are operated while the frame 104 is in a specified configuration, such as a specified profile. The operation of the conversion assembly 102, for instance to apply outward directed forces to the component frame members 108A, B also tensions the carriage tethers 120. The tension in the tethers is transmitted to the carriage 116, and accordingly pulls upwardly on the carriage 116 (according to the upward orientation of the tethers) to counteract a moment incident on the carriage due to gravity (into the page).

Additionally, the one or more carriage tethers 120 decrease twisting of the conversion assembly 102, such as the base frame member 110 otherwise caused by the carriage 116, power source 118 or the like coupled with the member 110. For example, without the carriage tethers 120 moment from the carriage 116 applies a twisting moment to the base frame member 110. The carriage tethers 116 distribute the carriage 116 moment to the conversion members 112 and the associated component frame members 108A, B as shown in FIG. 1. Twisting of the base frame member 110 is thereby decreased. In another example, continued application of force by the conversion assembly 102 (e.g., hydraulic cylinders or the like) in an outward manner while maintaining the frame members 108A, B in place further tensions the carriage tethers 116 and accordingly further counteracts the moment of the carriage 116 (and optional components on the carriage such as the power source 118). The load of the carriage 116 (and components thereon) is accordingly distributed to the component frame member 108, conversion members 112, or the like, and twisting moments otherwise applied to the base frame member 110 are decreased.

In another example, the implement operating apparatus 100 includes a steering actuator 122. The steering actuator 122 facilitates steering of the ground engaging elements 114. For example, the steering actuator 122 is operated to turn the ground engaging elements 114 with respect to the frame 104.

In yet another example, the implement operating apparatus 100 includes a frame actuator 124. The frame 104 includes a frame joint 126. The frame actuator 124 articulates the frame 104 at the frame joint 126. For instance, the frame 104 is articulable to facilitate loading and unloading of an implement from the implement operating apparatus 100. In another example, the frame joint 126 cooperates with the frame actuator 124, for instance to provide suspension to the frame 104 (including suspension of an implement attached with the frame 104).

Figure 2:
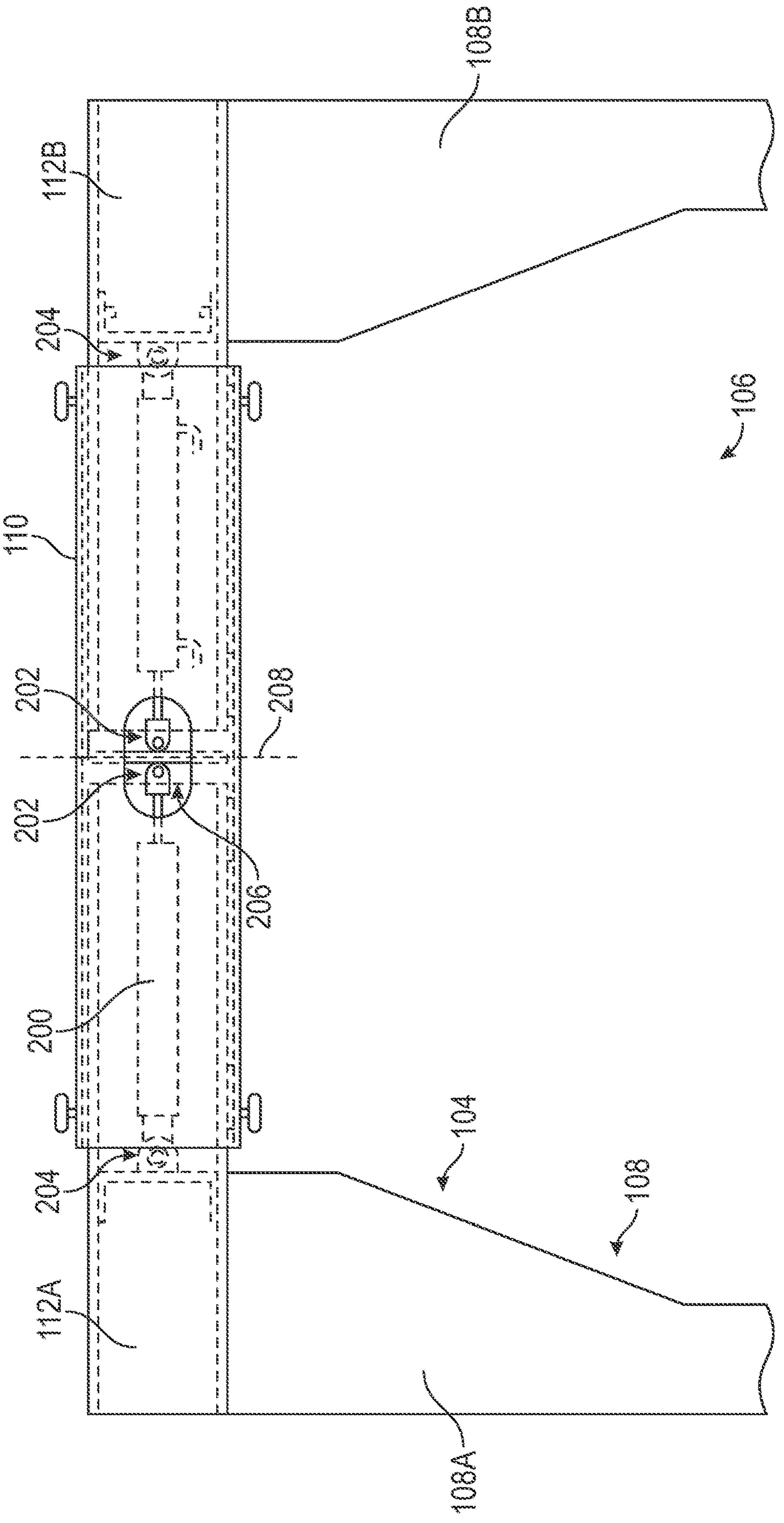
FIG. 2 is a cross-sectional view of one example of the conversion assembly shown in FIG. 1.

FIG. 2 is a detailed view of one example of the conversion assembly 102 shown in FIG. 1 that configures the implement operating apparatus 100. Certain components of the conversion assembly 102 are shown in FIG. 2 in dashed lines.

For example, FIG. 2 shows a conversion actuator 200 (in dashed lines) located within the base frame member 110 and the conversion members 112. In another example, the conversion actuator 200 is located outside of the base frame member 110 and the conversion members 112, for instance to facilitate maintenance of the conversion assembly 102. In yet another example, the conversion actuator 200 includes a pneumatic or hydraulic cylinder, and operation of the conversion actuator 200 reconfigures the frame 104 based on extension (or retraction) of the pneumatic or hydraulic cylinder. For instance, the conversion actuator 200 changes length, and the change in length of the conversion actuator 200 reconfigures the frame 104 by extending (or retracting) the conversion members 112 with respect to the base frame member 110. In another example, the conversion actuator 200 includes a jack, motor, solenoid, or the like. Optionally, as discussed here, the conversion actuator 200 applies one or more forces, for instance to linkages associated with the carriage 116, for instance through the carriage tethers 120. As described herein, force applied through the carriage tethers (e.g., optionally without expansion or contraction of the apparatus 100 supports the carriage 116 and minimizes deflection, such as twisting of the conversion assembly 102 including the base frame member 110.

In another example, the conversion actuator 200 extends between the base frame member 110 and the conversion members 112. For instance, a first end 202 of the conversion actuator 200 is coupled with the base frame member 110. A second end 204 of the conversion actuator 200 is coupled with a conversion member (e.g., one of the conversion members 112). A change in length of the conversion actuator 200 moves the conversion members 112 with respect to the base frame member 110.

For example, a change in length of the conversion actuator 200 displaces a first end 206 of conversion member 112A with respect to the base frame member 110, such as the centerline 208 of the member 110. In another example, the conversion member 112A extends from (e.g., outward from, or the like) the base frame member 110.

For example, the conversion member 112A is telescopically coupled with the base frame member 110. The first end 206 of a first conversion member 112A is received by the base frame member 110. In an example, the conversion member 112A telescopes relative to (e.g., into or out of) the base frame member 110. In another example, the conversion member 112A is slidably coupled with the base frame member 110. For example, a distance between the first end 206 and a centerline of the implement operating apparatus 100 is varied according to telescoping movement of the conversion member 112A with respect to the base frame member 110. Accordingly, movement of the conversion members (e.g., 112A, 112B) reconfigures the implement socket 106 between the component frame members 108. In another example, movement of the conversion members reconfigures the implement operating apparatus 100, such as the frame 104 to facilitate positioning of the ground engaging elements between crop rows to conduct operations in various fields having varied crop row spacing. In yet another example, the conversion members 112 are rotationally coupled with the base frame member 110 (e.g., the conversion members unfold, or the like). In yet another example, the conversion members 112 are arranged in a concertina configuration with the base frame member 110 (e.g., as a scissor jack). In still yet another example, the conversion members 112 are interleaved with the base frame member 110 (e.g., one or more hinged members unfold to reconfigure the adjustable socket 106).

In a further example, the base frame member 110 is coupled between the component frame members 108. The base frame member 110 interconnects the component frame members 108. For example, conversion member 112B of the component frame member 108A is coupled base frame member 110. A second conversion member 112B of the second component frame member 108B is coupled with the base frame member 110. The first conversion member 112A and the second conversion member 112B are moveably coupled with the base frame member 110.

Accordingly, the base frame member 110 is coupled between the component frame members 108A, 108B, for instance with the conversion members 112.

Figure 3:
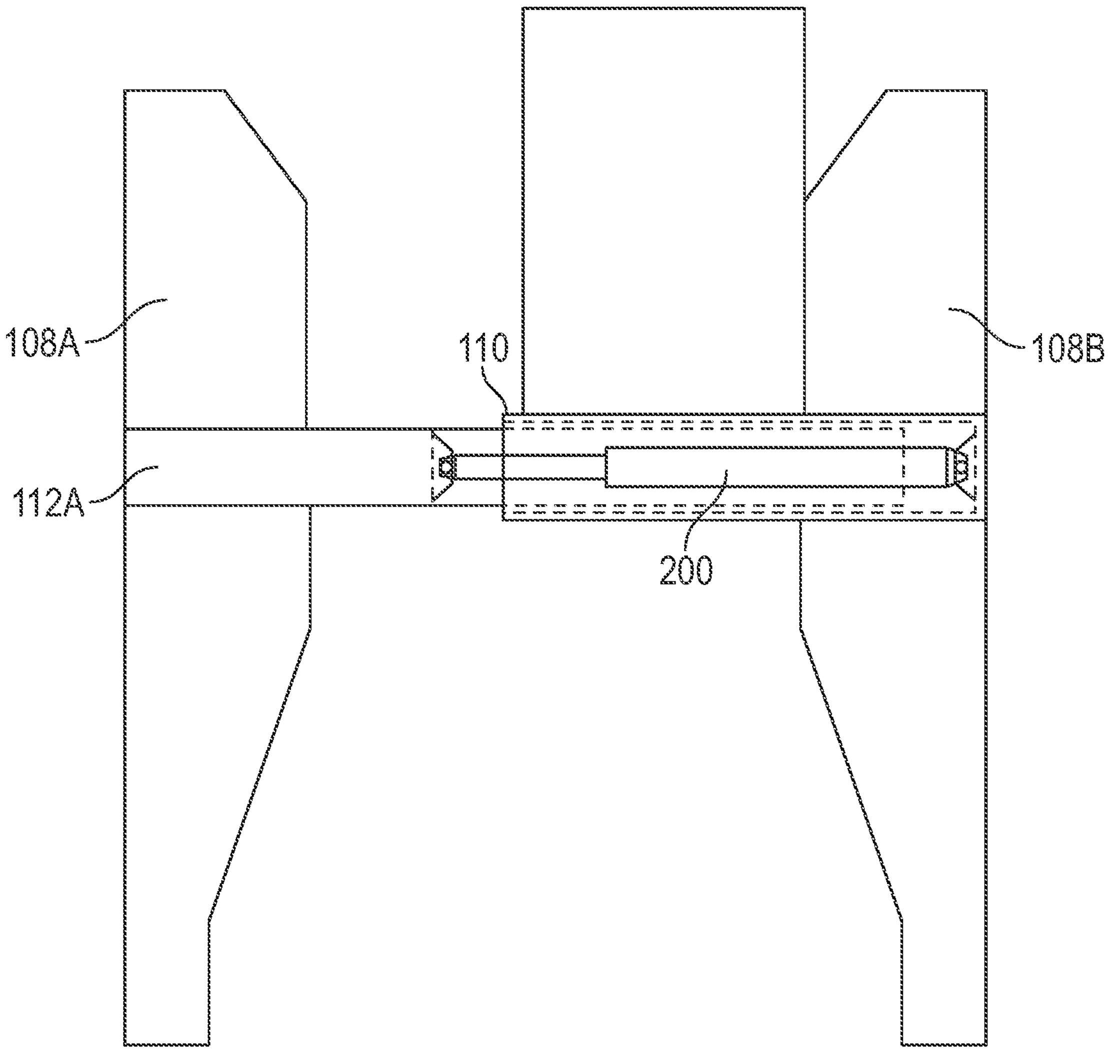
FIG. 3 is a cross sectional view of another example of the conversion assembly shown in FIG. 1.

FIG. 3 is a cross sectional view of another example of the conversion assembly 102 shown in FIG. 1. The implement operating apparatus 100 includes the component frame members 108 and the base frame member 110. For example, the base frame member 110 is coupled with the second component frame member 108B. The conversion member 112A is coupled with the first component frame member 108A. The conversion member 112A is moveably coupled with the base frame member 110. For instance, the conversion actuator 200 moves the conversion member 112A relative to the base frame member 110. Accordingly, the conversion assembly 102 moves the first component frame member 108A relative to the second component frame member 108B (and the base frame member 110).

The implement operating apparatus 100 includes the carriage 116. The carriage is coupled with one or more of the second component frame member 108B or the base frame member 110. The remainder of the conversion assembly 102 or the frame 104 (e.g., the opposed frame member 108A and the conversion member 112A) is movable relative to the carriage 116.

Figure 4:
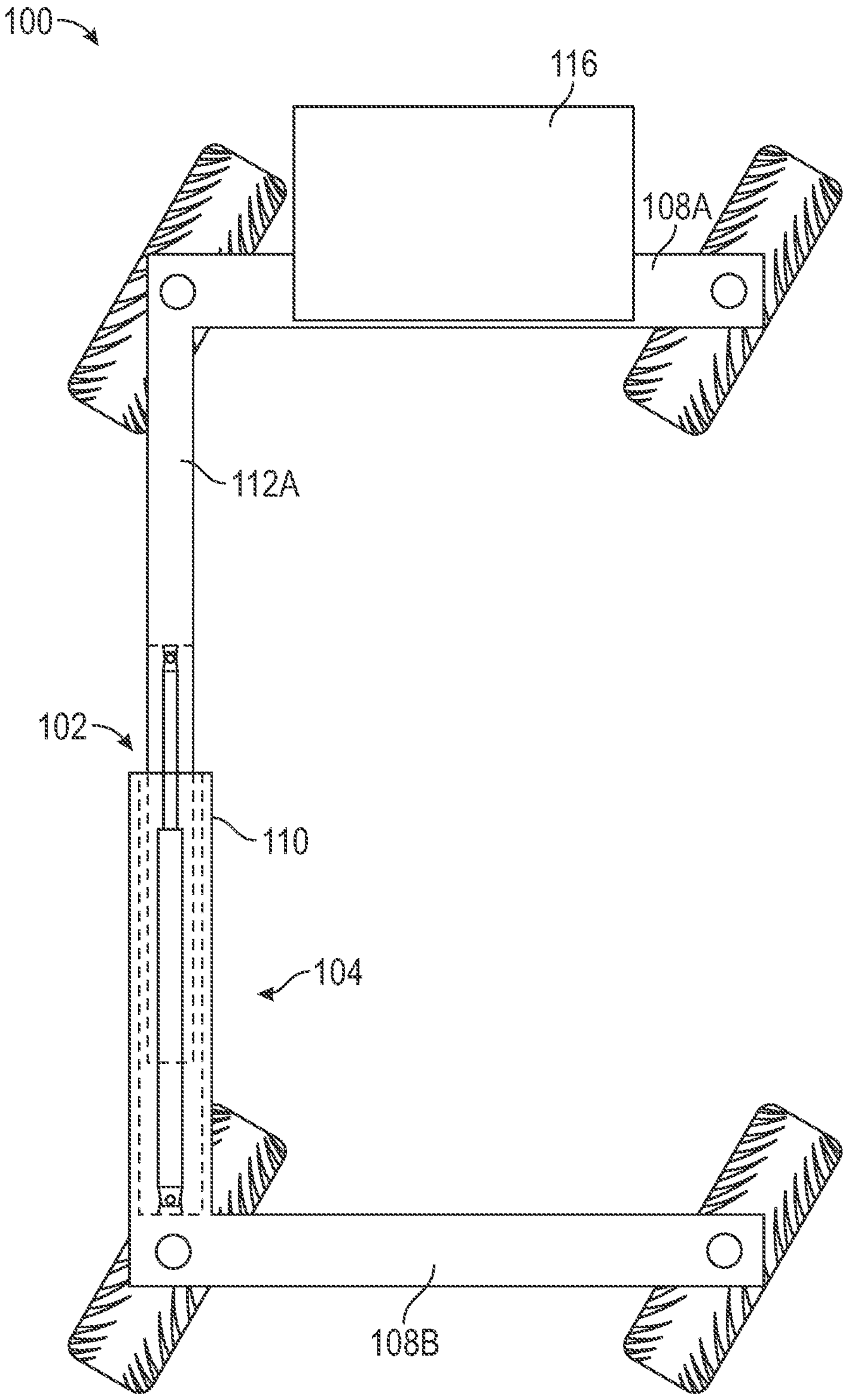
FIG. 4 is a plan view of another example of an implement operating apparatus.

FIG. 4 is a plan view of another example of an implement operating apparatus 100. The frame 104 includes the component frame members 108. For instance, the first component frame member 108A is moveable relative to the second component frame member 108B. In an example, the base frame member 110 is coupled with the second component frame member 108B. For instance, the base frame member 110 is integral to the second component frame member 108B. The conversion member 112A is coupled with the first component frame member 108A.

The conversion member 112A is moveably coupled with the base frame member 110. For instance, the conversion assembly 102 is interposed between the base frame member 110 and the conversion member 112A. The conversion actuator 200 moves the conversion member 112A relative to the base frame member 110.

Accordingly, the first component frame member 108A is moveable relative to the second component frame member 108B.

In another example, the implement operating apparatus 100 includes the carriage 116. For instance, the carriage 116 is coupled with one or more of the first component frame member 108A or the conversion member 112A. The remainder of the conversion assembly 102 or the frame 104 (e.g., the second component frame member 108B, the base frame member 110, or the like) is moveable relative to the carriage 116.

Figure 5:
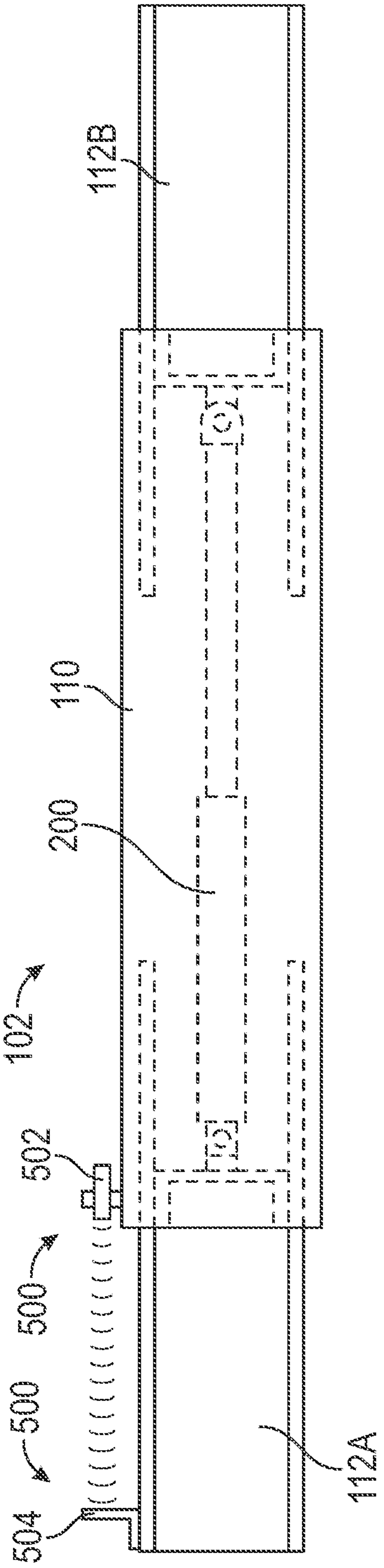
FIG. 5 is a view of one example of an indexing system for use with a conversion assembly.

FIG. 5 is a view of one example of an indexing system 500 for use with the conversion assembly 102. In this example, the conversion assembly 102 includes the base frame member 110 and the first and second conversion members 112A, 112B. The base frame member 110 is interposed between the first conversion member 112A and the second conversion member 112B. The conversion members 112A, 112B are moveable (e.g., telescopically, or the like) relative to the base frame member 110. For instance, the conversion actuator 200 is coupled between the first conversion member 112A and the second conversion member 112B. In other examples, the conversion actuator 200 is coupled between the base frame member 110 and one or more of the first conversion member 112A or the second conversion member 112B (e.g., the implement operating apparatus 100 shown in FIGS. 1-4).

The indexing system 500 provides confirmation or feedback to facilitate accurate conversion of the conversion assembly 102 to a specified position (e.g., implement socket profile, ground engaging element spacing, both or the like). The indexing system 500 permits determination of the position (including positions) of conversion members 112A, B, associated component frame members 108A, B, ground engaging elements, implement socket or the like. For example, the indexing system 500 includes one or more of a conversion sensor 502, conversion fiducial 504, both or the like. The conversion sensor 502 detects the position of one or more components of the conversion assembly 102, such as the conversion fiducial 504. In one example, the conversion sensor 502 is used with a control system to provide confirmation or feedback the conversion assembly 102 has converted to a specified position.

The indexing system 500 optionally includes the conversion fiducial 504 (e.g., a marker, markings, detectable indicia, or the like), for instance a ferrous metal fiducial, near field fiducial, optically recognizable fiducial (e.g., as an optical encoder) or the like that is detected with the conversion sensor 502. In an example, the conversion fiducial 504 is coupled with the first conversion member 112A. The conversion sensor 502 is coupled with the base frame member 110. The conversion fiducial 504 moves with the first conversion member 112A relative to the base frame member 110.

The conversion sensor 502 cooperates with the conversion fiducial 504 to detect positions of one or more components of the conversion assembly 102 and the apparatus 100. For instance, the conversion sensor 502 cooperates with the conversion fiducial 504 to determine a distance between the conversion sensor 502 and the conversion fiducial 504. In an example, the distance between the conversion sensor 502 and the conversion fiducial 504 changes based on operation of the conversion actuator 200. The conversion actuator 200 moves the conversion members 112 and accordingly the distance between the conversion sensor 502 and the conversion fiducial 504 is representative of the position of the conversion members 112 relative to the base frame member 110. The conversion sensor 502 detects the position of a relatively moving component of the conversion assembly 102, for instance through monitoring of the conversion fiducial 504. Changes in position, position detection or the like are thereby monitored with the indexing system 500 to permit accurate control of the conversion assembly 102 including positioning of the conversion members 112A, B, associated component frame members 108A, B, ground engaging elements, implement socket or the like at specified locations, spacing or the like.

Figure 6:
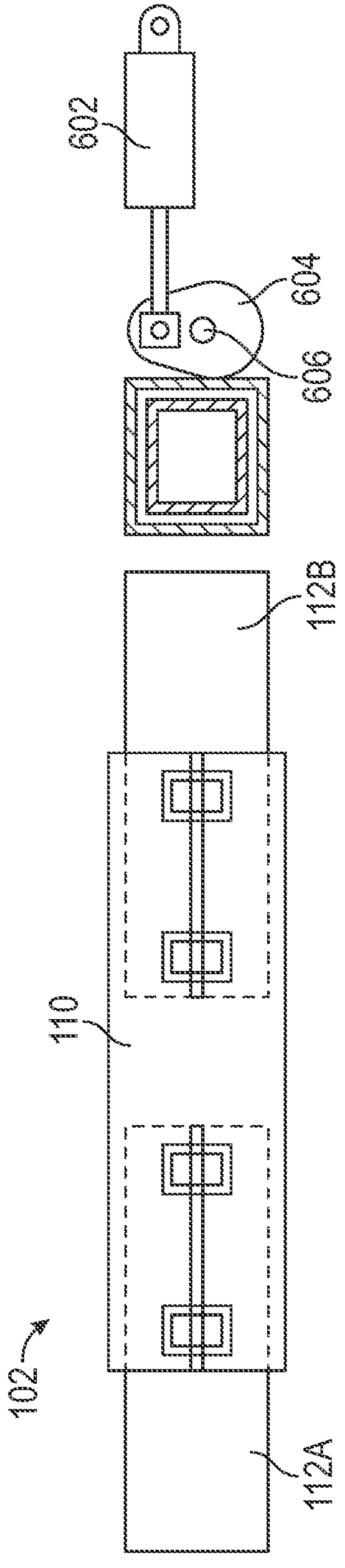
FIG. 6 is a view of one example of a conversion lock system.

FIG. 6 is a view of one example of a conversion lock system 600 for the conversion assembly 102. The conversion lock system 600 selectively secures and unsecures (e.g., locks and unlocks) the conversion members 112 to permit or preclude movement of the conversion members 112. For instance, the conversion lock system 600 secures the conversion members 112 to preclude movement (e.g., with the members 112 at specified positions) of the conversion members 112 relative to the base frame member 110. In another example, the conversion lock system 600 is transitioned to an unsecured configuration to permit movement of the conversion members 112 relative to the base frame member 110. For example, the conversion lock system 600 affirmatively retains the conversion member (or members) 112 in a specified position, for instance to maintain one or more of a specified implement socket profile or ground engaging element spacing.

In an example, the conversion lock system 600 includes a lock actuator 602. The lock actuator 602 includes, but is not limited to, a hydraulic, cylinder, pneumatic cylinder, a stepper motor or the like. The lock actuator 602 transitions the conversion lock system 600 between the secure and unsecure configurations. For instance, operation of the lock actuator 602 secures the conversion members 112 to preclude movement of the conversion members 112 relative to the base frame member 110.

In another example, the conversion lock system 600 includes a cam operator 604. As shown in FIG. 6, the cam operator 604 is pivotally coupled with the lock actuator 602. Optionally, the lock actuator 602 is coupled eccentrically with the cam operator 604, and the cam operator 604 is rotatable eccentrically, for instance around a pin 606 extending through the cam operator 604. The cam operator 604 selectively engages with one or more of a conversion member (e.g., the first conversion member 112A) or the base frame member 110 to prohibit movement of the conversion member relative to the base frame member 110. For example, the cam operator 604 biases the associated conversion member 112 to engage with the base frame member 110. The engagement secures the members 112, 110 and locks the members in position.

In an example, the lock actuator 602 cooperates with the cam operator 604 to prohibit movement of the conversion member relative to the base frame member 110 to secure the conversion members 112 and preclude movement of the conversion members 112 relative to the base frame member 110 (e.g., from a specified position). In one example, the cam operator 604 engages with the conversion members 112, for example through a port in the base frame member 110. Optionally, the cam actuator positions a pin through the port in the members (e.g., the pin acts as a cotter pin to prohibit movement of the conversion member relative to the base frame member, or the like). In yet another example, the engagement of the cam operator 604 with one or more of the conversion members 112 or the base frame member 110 biases the conversion members 112 and the base frame member 110 together and prohibits relative movement between the conversion members 112 and the base frame member 110. Optionally, knurled or complementary ridged surfaces are provided between the conversion members 112 and the base frame member 110. Biasing of the cam operator toward one or more of the conversion members 112 or the base frame member 110 (using the lock actuator 602) affirmatively seats the complementary ridged surfaces with each other to prohibit relative movement between the conversion members 112 and the base frame member 110.

Figure 7A:
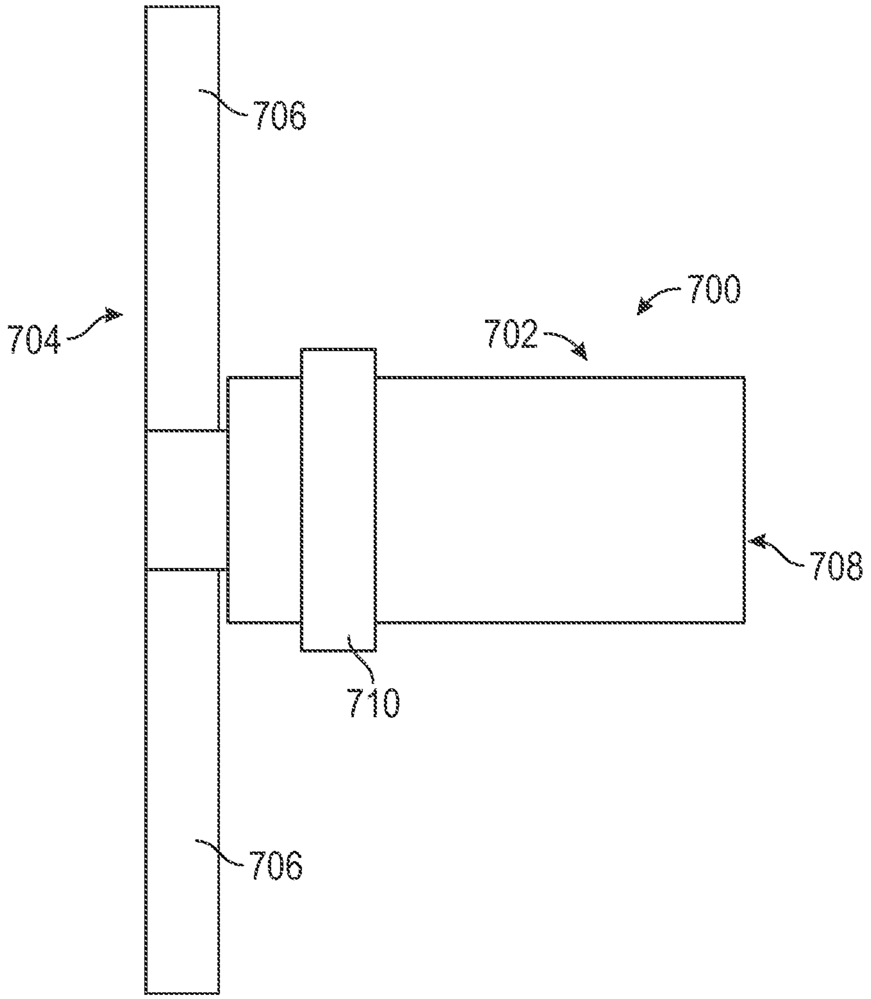
FIG. 7A is a schematic view of a first example of an agricultural implement having a first implement profile and an associated implement tool in a deployed configuration.

FIG. 7A is a schematic view of a first example of an agricultural implement 700 having a first implement profile 702 and an associated implement tool 704 in a deployed configuration. In this example, the agricultural implement 700 is a sprayer having sprayer booms 706 as the implement tool 704. The agricultural implement 700 has an implement body 708, and the implement body 708 is configured for coupling with the implement operating apparatus 100. For example, the implement 700 is received in the adjustable implement socket 106 (shown in FIG. 1) of the implement operating apparatus 100. The implement operating apparatus 100 supports the implement body 708 and maneuvers the implement 700 through a field for conduct of one or more agricultural operations.

Optionally, as discussed herein the implement 700 and implement operating apparatus 100 cooperatively support each other to minimize deformation (e.g., twisting, bowing, bending or the like) of the apparatus 100 loaded with the implement 700.

In another example, the agricultural implement 700 includes an implement support member 710. The implement support member 710 couples between component frame members 108 (shown in FIG. 1). In one example, the implement support member 710 cooperatively supports the component frame members 108.

For instance, the implement support member 710 braces the component frame members 108 against bending (e.g., deflecting toward each other, twisting upwardly, twisting about a longitudinal axis of the component frame member, or the like). The implement support member 710 couples across the implement socket 106, interconnects the component frame members 108, and braces the component frame members 108.

Optionally, the implement support member of various agricultural implements includes one or more of complementary ends, fittings, or the like that provide a complementary coupling between the implement support member 710 and the component frame member 108. For example, the implement support member 710 varies in size (e.g., length, or the like) based on the implement, to permit coupling of various implement profiles within corresponding implement sockets 106 configured with the conversion assembly 102 of the implement operating apparatus 100.

Figure 7B:
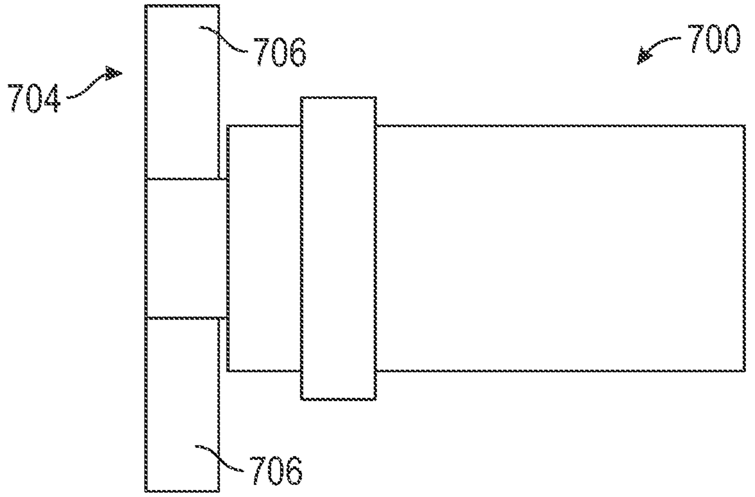
FIG. 7B is a schematic view of the agricultural implement of FIG. 7A with the implement tool in a stowed configuration.

FIG. 7B is a schematic view of the agricultural implement 700 of FIG. 7A with the implement tool 704 in a stowed configuration. For example, the booms 706 are optionally folded to stow the booms 706 in a vertical orientation, concertina configuration or the like. Accordingly, the agricultural implement 700 has a stowed configuration (shown in FIG. 7B) and a deployed configuration (shown in FIG. 7A).

Figure 8:
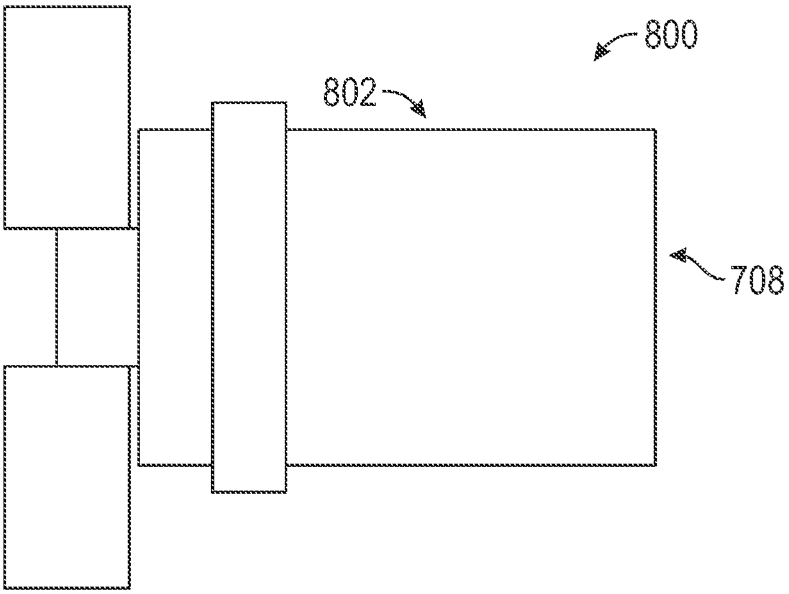
FIG. 8 is a schematic view of a second example of an agricultural implement having a second implement profile.

FIG. 8 is a schematic view of a second example of an agricultural implement 800 having a second implement profile 802. For example, the implement body 708 of the second agricultural implement 800 is larger than the implement body 708 of the first agricultural implement 700. The adjustable implement socket 106 (shown in FIG. 1) is expanded in this example relative to the examples shown in FIGS. 7A and 7B to accommodate the larger implement profile (e.g., the implement body 708 being larger with the second agricultural implement 800).

FIG. 8 further shows the implement support member 710 is larger than the implement support member 710 shown in FIGS. 7A and 7B. For example, the implement support member 710 is larger in FIG. 8 because of the larger implement profile 802.

Figure 9:
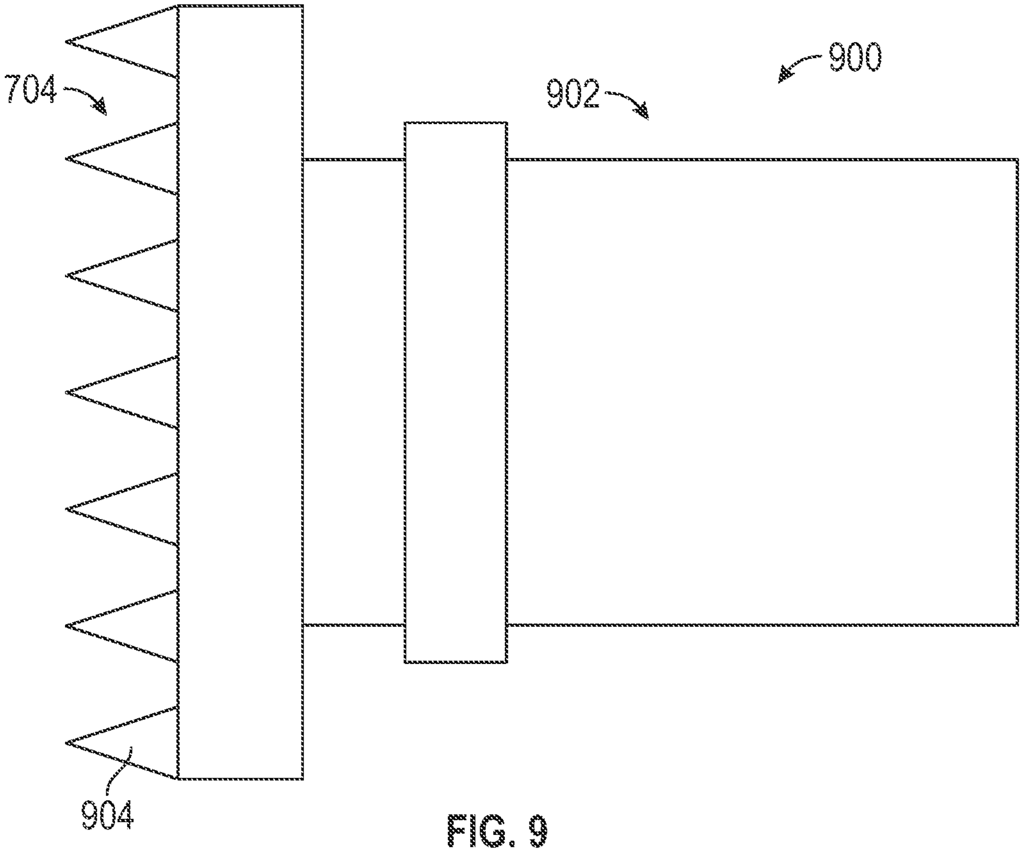
FIG. 9 is a schematic view of a third example of an agricultural implement having a third implement profile.

FIG. 9 is a schematic view of a third example of an agricultural implement 900 having a third implement profile 902. In this example, the third implement profile 902 is larger than the second implement profile 802 (shown in FIG. 8) and the first implement profile 702 (shown in FIG. 7A). The adjustable implement socket 106 (shown in FIG. 1) is expandable to accommodate the larger implement profile. For instance, the adjustable implement socket 106 is expanded to a first configuration to accommodate the first implement profile 702. The adjustable implement socket 106 is expanded (relative to the first configuration) to accommodate the second implement profile 802. The adjustable implement socket 106 is expanded further (relative to the first configuration and the second configuration) to accommodate the third implement profile 902. Accordingly, the implements 700, 800, 900 with varying profiles are accommodated by the implement operating apparatus 100.

FIG. 9 shows the implement tool 704 includes a harvester head 904. Accordingly, in some examples, the implement 900 includes a harvester or combine. For instance, the implement 900 includes processing tools and a grain bin for storage of processed grain.

Figure 10:
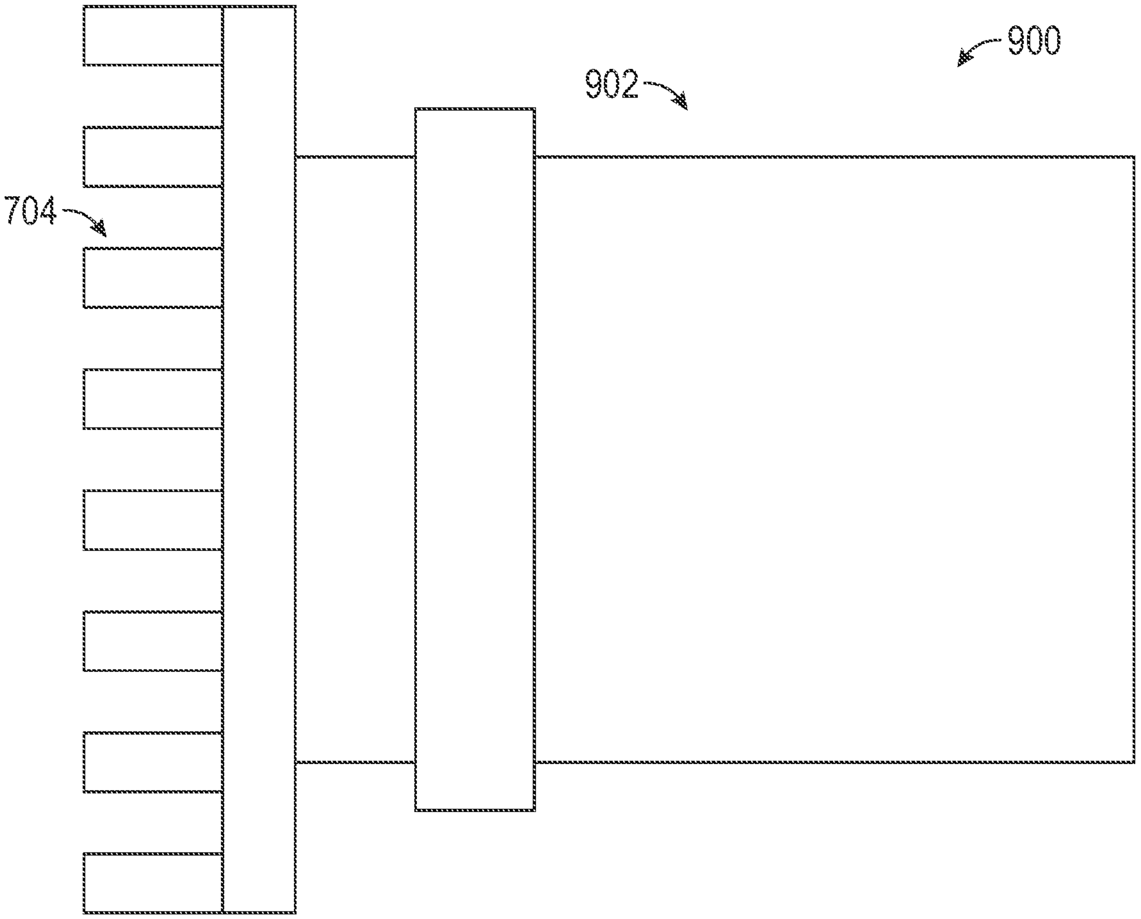
FIG. 10 is a schematic view of a fourth example of an agricultural implement having a fourth implement profile.

FIG. 10 is a schematic view of a fourth example of an agricultural implement 1000 having a fourth implement profile 1002. The fourth implement profile 1002 is larger than the third implement profile 902 (and the second implement profile 802 and first implement profile 702). The adjustable implement socket 106 (shown in FIG. 1) is expanded to accommodate the fourth implement profile 1002. Accordingly, the implement operating apparatus 100 is adapted to accommodate implements 700, 800, 900, 1000 with differing profiles 702, 802, 902, 1002.

Figure 11A:
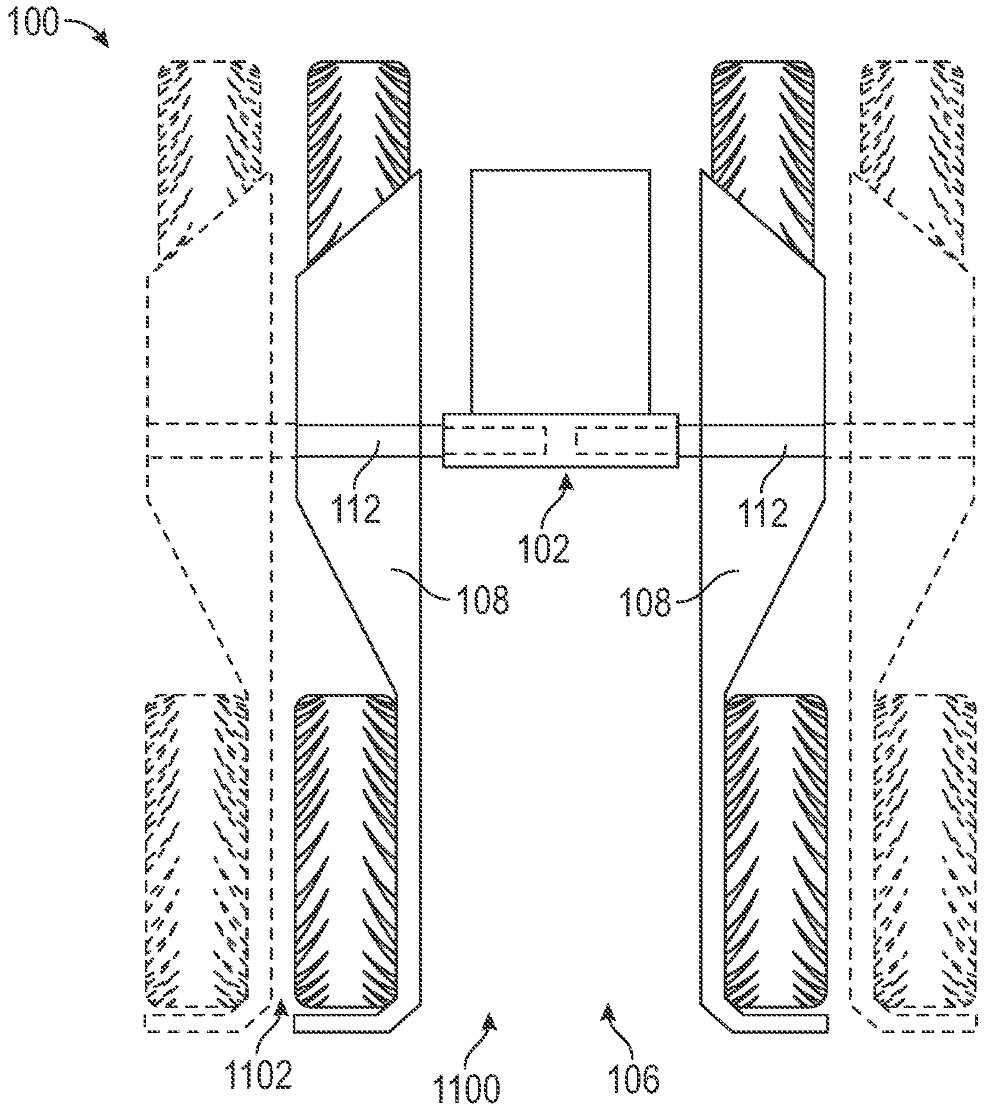
FIG. 11A is a schematic view of an example implement operating apparatus in first and second configurations.

FIG. 11A is a schematic view of the example implement operating apparatus 100 in first and second configurations. The first configuration is represented with solid lines in FIG. 11A. The second configuration is represented with dashed lines. The conversion assembly 102 moves the conversion members 112 relative to the base frame member 110 to transition between the first and second configurations.

The implement operating apparatus 100 includes the conversion assembly 102 to reconfigure the implement operating apparatus 100 between the first and second configurations. The first and second configurations are examples. The conversion assembly 102 configures the apparatus into multiple configurations (e.g., between the first and second configurations, narrower, wider or the like). The conversion assembly 102 extends (or retracts) the conversion members 112 with respect to the base frame member 110 to reconfigure the implement operating apparatus 100 between the first and second configurations. In an example, the adjustable implement socket 106 has a first socket profile 1100 with the implement operating apparatus 100 in the first configuration (solid lines in FIG. 11A). The adjustable implement socket 106 has a second socket profile 1102 with the implement operating apparatus 100 in the second configuration (dashed lines in FIG. 11A). One or more of the socket profiles 1100, 1102 are configured to enclose (or extend around) portions of first or second agricultural implements, for example the implement 700 or the implement 800. Accordingly, the conversion assembly 102 controls the profile of the adjustable implement socket 106 to accommodate implements 700, 800, 900, 1000 with associated differing profiles 702, 802, 902, 1002. For example, the first socket profile 1100 accommodates the first implement profile 702 of the agricultural implement 700 shown in FIGS. 7A, B. The second socket profile 1102 accommodates the second implement profile 802 shown in FIG. 8.

FIG. 11A shows the component frame members 108 are positioned in an overlying manner relative to the ground engaging elements 114. With the overlying position of the component frame members 108 gravity vectors for weight and load (e.g., of a coupled implement) in a free body diagram extend through the ground engaging elements 114. Accordingly, off-axis loading of the ground engaging elements 114 is minimized that otherwise may cause twisting of the component frame members 108, the conversion assembly 102 or the like. Instead, weight, load from a coupled implement, the component frame members 108 or the like is vertically carried by the component frame members 108 and the aligned, and underlying, ground engaging elements 114.

Figure 11B:
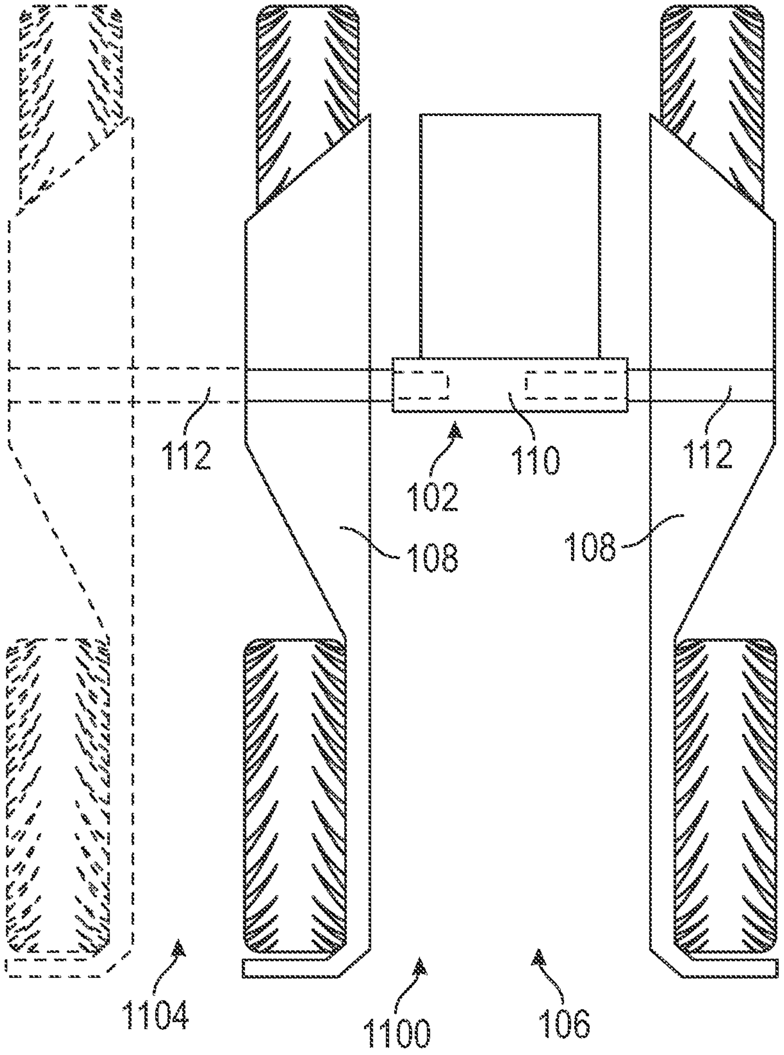
FIG. 11B is a schematic view of an example implement operating apparatus in first and third configurations.

FIG. 11B is a schematic view of an example implement operating apparatus in first and third configurations. The first configuration is represented with solid lines in FIG. 11B. The third configuration is represented with dashed lines in FIG. 11B. In the example shown, one of the conversion members 112 are moved relative to the base frame member 110 in the third configuration.

Optionally, the conversion member 112 (e.g., 112A) is preferentially moved with the conversion assembly 102 and the opposed conversion member 112 (e.g., 112A) is moved a lesser amount (including not moving).

The conversion assembly 102 configures the implement operating apparatus 100 between the first and third configurations. For example, the conversion assembly 102 moves the conversion member 112 to reconfigure the implement operating apparatus 100. In this example, movement of the conversion member 112 correspondingly changes the size of the adjustable implement socket 106. For instance, movement of the conversion member 112 to the position shown in dashed lines in FIG. 11B reconfigures the adjustable implement socket 106 to have a third socket profile 1104. Accordingly, the conversion assembly 102 controls the profile of the adjustable implement socket 106 to receive and couple with various implements 700, 800, 900, 1000 with differing profiles 702, 802, 902, 1002.

Figure 12:
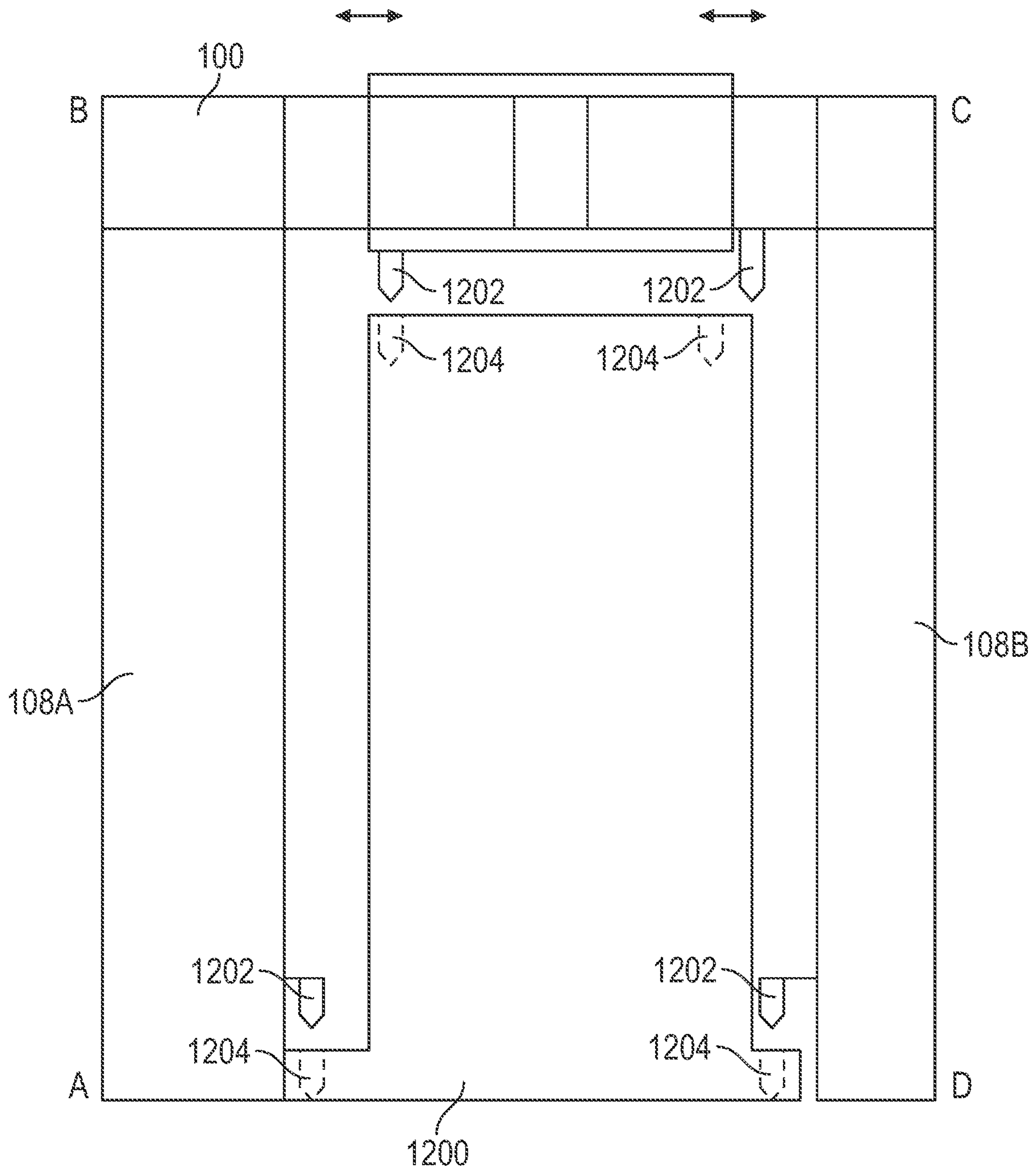
FIG. 12 is a plan view of one example of frame anchors configured to incorporate an agricultural implement with the implement operating apparatus and support one or both of the implement operating apparatus and the agricultural implement.

FIG. 12 is a plan view of one example of frame anchors 1200 configured to incorporate an agricultural implement 1200 with the implement operating apparatus 100 and support one or both of the implement operating apparatus 100 and the agricultural implement 1200. For example, the implement operating apparatus 100 includes the frame anchors 1202. The implement includes one or more anchor sockets 1204 that correspond with the frame anchors 1200. For instance, the frame anchors 1202 interfit with the anchor sockets 1204. Interfitting of the frame anchors 1202 with the one or more anchor sockets 1204 affirmatively unifies (e.g., fuses, fixes, amalgamates, binds, bonds, consolidates or the like) the otherwise separate implement 1200 and the implement operating apparatus 100 into a unitary vehicle. Accordingly, the frame anchors 1202 (and the one or more anchor sockets 1204) enhance the coupling of the implement 1200 with the implement operating apparatus 100 and facilitate transmission of forces and moments (e.g., bending or twisting moments) between the implement operating apparatus 100 and the implement 1200. For example, the frame anchors 1202 and the anchor sockets 1204 cooperatively fix the position of the implement 1200 relative to the implement operator apparatus 100 to minimize shifting, settling or the like of the implement 1200 (and corresponding relative movement). Instead, the frame anchors and anchor sockets 1204 unify the implement 1200 and the apparatus 100 in a manner that consolidates the otherwise separate components into a single agricultural vehicle.

In another example, FIG. 12 shows the first component frame member 108A has a larger profile than the second component frame member 108B. For instance, a power source, control system, or the like is associated with the first component frame member 108A. The implement 1200 has an implement center of gravity, and the implement operating apparatus 100 has its own apparatus center of gravity. The apparatus center of gravity is spaced from the geometric center with the component frame member 108A having the larger profile. Optionally, the spacing of the apparatus center of gravity is specified and intended to cooperate with the implement center of gravity (with the implement installed). With the implement 1220 installed, the implement center of gravity is located at an opposed position (e.g., an opposed side of center) relative to the apparatus center of gravity. Accordingly, a composite center of gravity of the apparatus and the implement based on the component implement and apparatus centers of gravity is positioned proximate to the geometric center of the implement operating apparatus 100 (e.g., between the ground engaging elements, substantially equidistant, or the like). The positioning of the composite center of gravity proximate to the center decreases one or more of leaning, tipping, compaction of soil with ground engaging elements or the like.

Figure 13A:
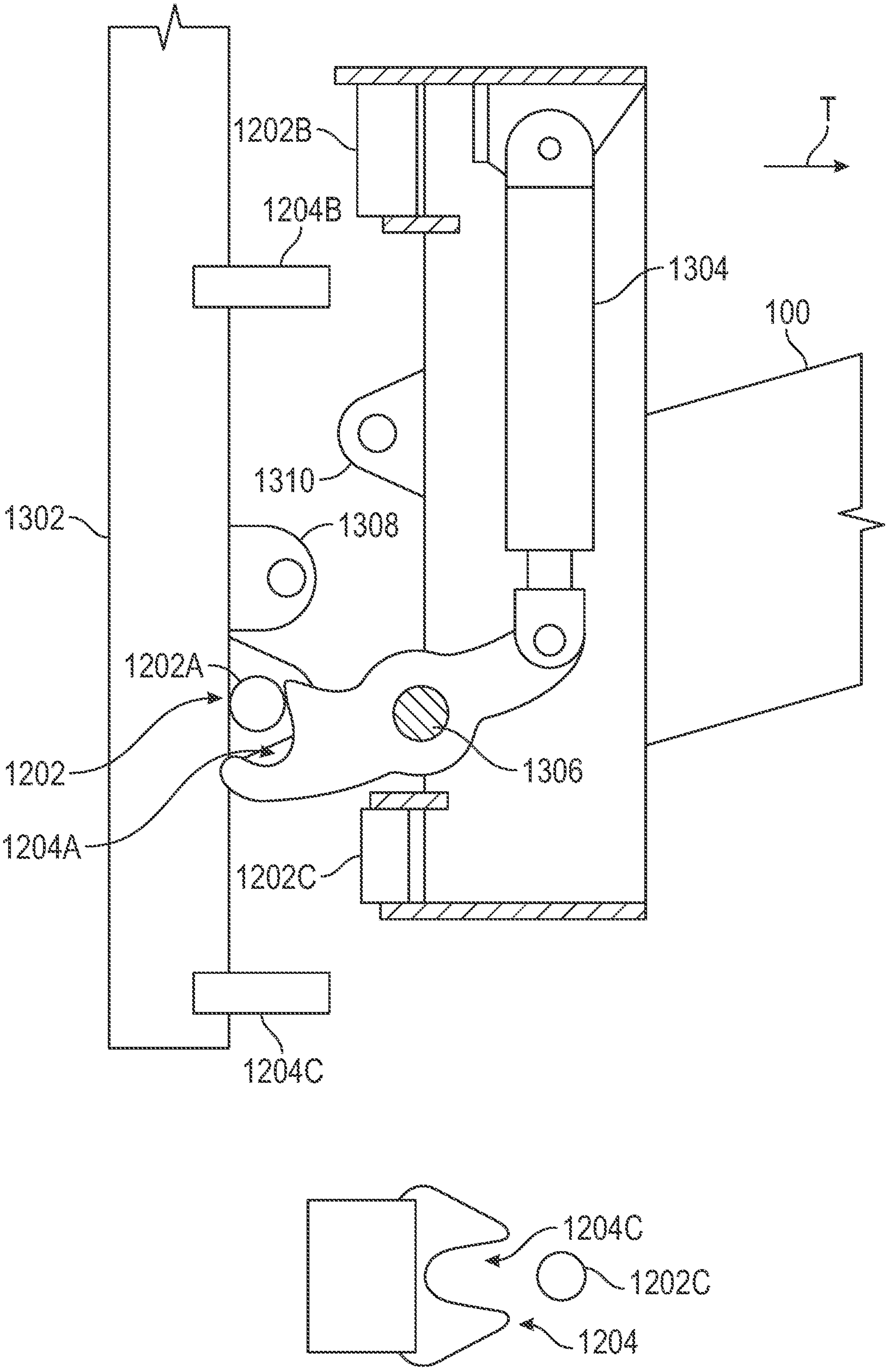
FIG. 13A is a side view of one example latch assembly of an implement operating apparatus.

FIG. 13A is a side view of one example latch assembly 1300 of the implement operating apparatus 100. In an example, the latch assembly 1300 facilitates coupling of an implement 1302 with the implement operating apparatus 100. FIG. 13A shows the latch assembly 1300 in an unlocked configuration. For instance, one or more frame anchors 1202 are separated from one or more complementary anchor sockets 1204 in FIG. 13A. The frame anchors 1202 and anchor sockets 1204 shown in FIG. 13A are optionally used alone, or in combination with the frame anchors 1202 and the one or more anchor sockets 1204 shown in FIG. 12. In another example, the frame anchors 1202 are a feature of the implement 1302 (in contrast to the frame anchor 1202 provided on the implement operating apparatus 100 in FIG. 12). In yet another example, the frame anchors 1202 are a feature of the implement operating apparatus 100.

In an example, the frame anchors 1202 include one or more of a first frame anchor 1202A, a second frame anchor 1202B, or a third frame anchor 1202C. The frame anchors 1202 interfit with complementary anchor sockets 1204 to couple the implement 1302 with the implement operating apparatus 100. For example, the implement 1302 includes the first frame anchor 1202A. The first frame anchor 1202A interfits with a first anchor socket 1204 of the implement operating apparatus 100. The second frame anchor 1202B interfits with a second anchor socket 1204B. The third frame anchor 1202C interfits with a third anchor socket 1204C. Accordingly, the interfitting of frame anchors 1202 with complementary anchor sockets 1204 facilitates coupling of the implement 1302 with the implement operating apparatus 100. For instance, the interfitting of frame anchors 1202 with complementary one or more anchor sockets 1204 enhances coupling of the implement 1302 and the 100 into a unitary vehicle.

In another example, the first anchor socket 1204A is moved with an anchor actuator 1304 to interfit the first frame anchor 1202A with the first anchor socket 1204A. For instance, the first anchor socket 1204A is rotated about a pivot 1306 (using the anchor actuator 1304) to interfit the first frame anchor 1202A with the first anchor socket 1204A. In another example, operation of the anchor actuator 1304 couples the implement 1302 with the implement operating apparatus 100. For instance, operation of the anchor actuator 1304 interfits (and locks) the frame anchors 1202 with the complementary anchor sockets 1204.

FIG. 13A shows the implement 1302 includes a first security bracket 1308. The implement operating apparatus 100 includes a second security bracket 1310. The security brackets 1308, 1310 are configured to align with each other, for instance to facilitate reception of a fastener (e.g., pin, rod, cotter pin, bolt, or the like) and securing of the implement 1302 to the implement operating apparatus 100.

Figure 13B:
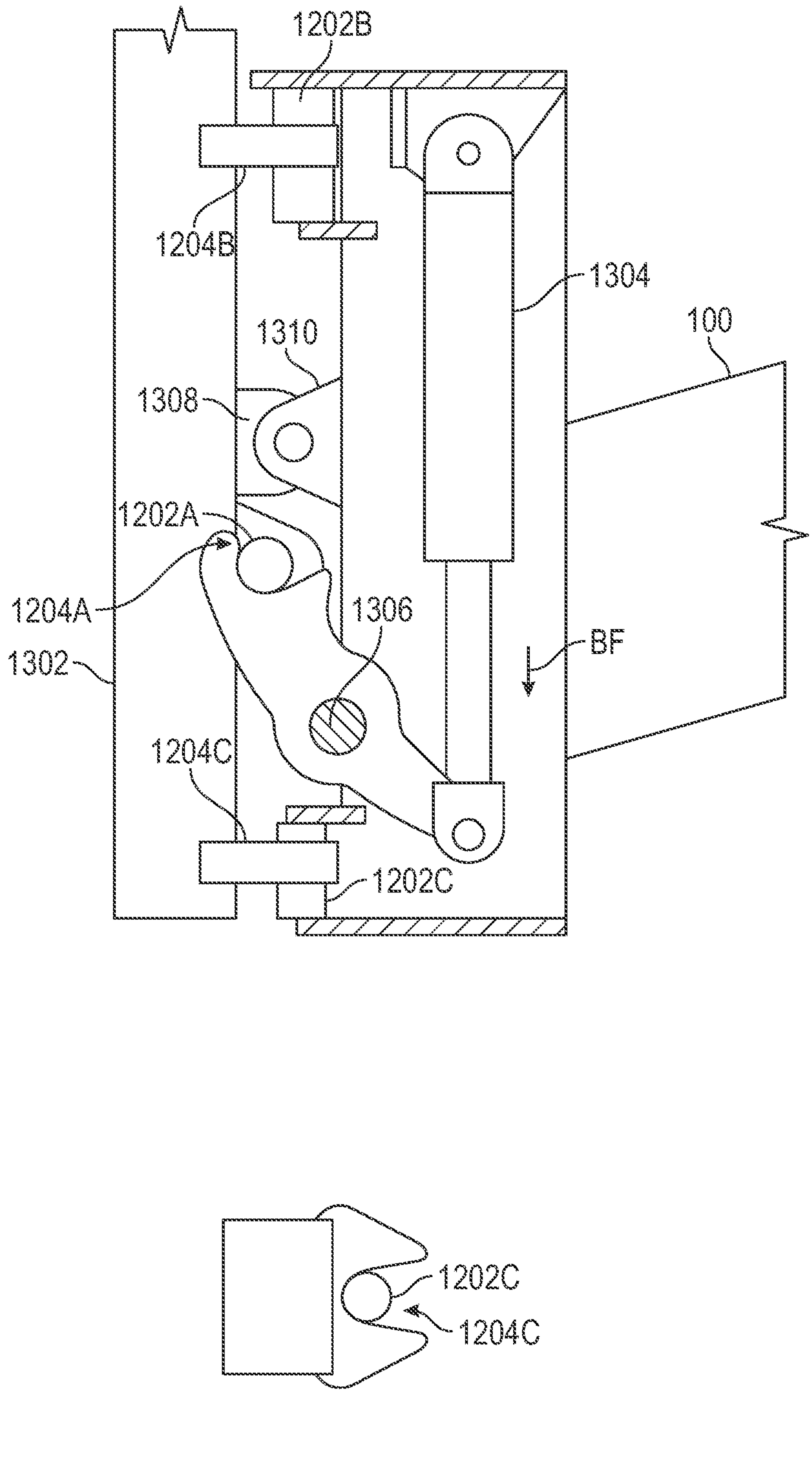
FIG. 13B is a side view of the example latch assembly of FIG. 13A in a locked configuration with an agricultural implement.

FIG. 13B is a side view of the example latch assembly of FIG. 13A in a locked configuration with an agricultural implement. The first frame anchor 1202A is interfit with the first anchor socket 1204A. The second frame anchor 1202B is interfit with the second anchor socket 1204B. The third frame anchor 1202C is interfit with the third anchor socket 1204C. Accordingly, the implement 1302 is coupled with the implement operating apparatus 100 as a unitary vehicle.

In another example, the 1304 supplies a biasing force (BF) to maintain the interfit between frame anchors 1202 and the one or more anchor sockets 1204. For instance, the biasing force is applied to the implement 1302 using the first anchor socket 1204A rotating about the pivot 1306 to interfit with the first frame anchor 1202A. In yet another example, FIG. 13B shows the first security bracket 1308 is aligned with the second security bracket 1310. Accordingly, the security brackets 1308, 1310 optionally receive a fastener to secure the implement 1302 with the implement operating apparatus 100. For instance, the anchor actuator 1304 lifts the implement 1302 to a coupled position with the implement operating apparatus 100 as shown in FIG. 13B. The lifting of the implement 1302 aligns the security brackets 1308, 1310. Thus, the anchor actuator 1304 enhances coupling of the implement 1302 with the implement operating apparatus 100.

Figure 14:
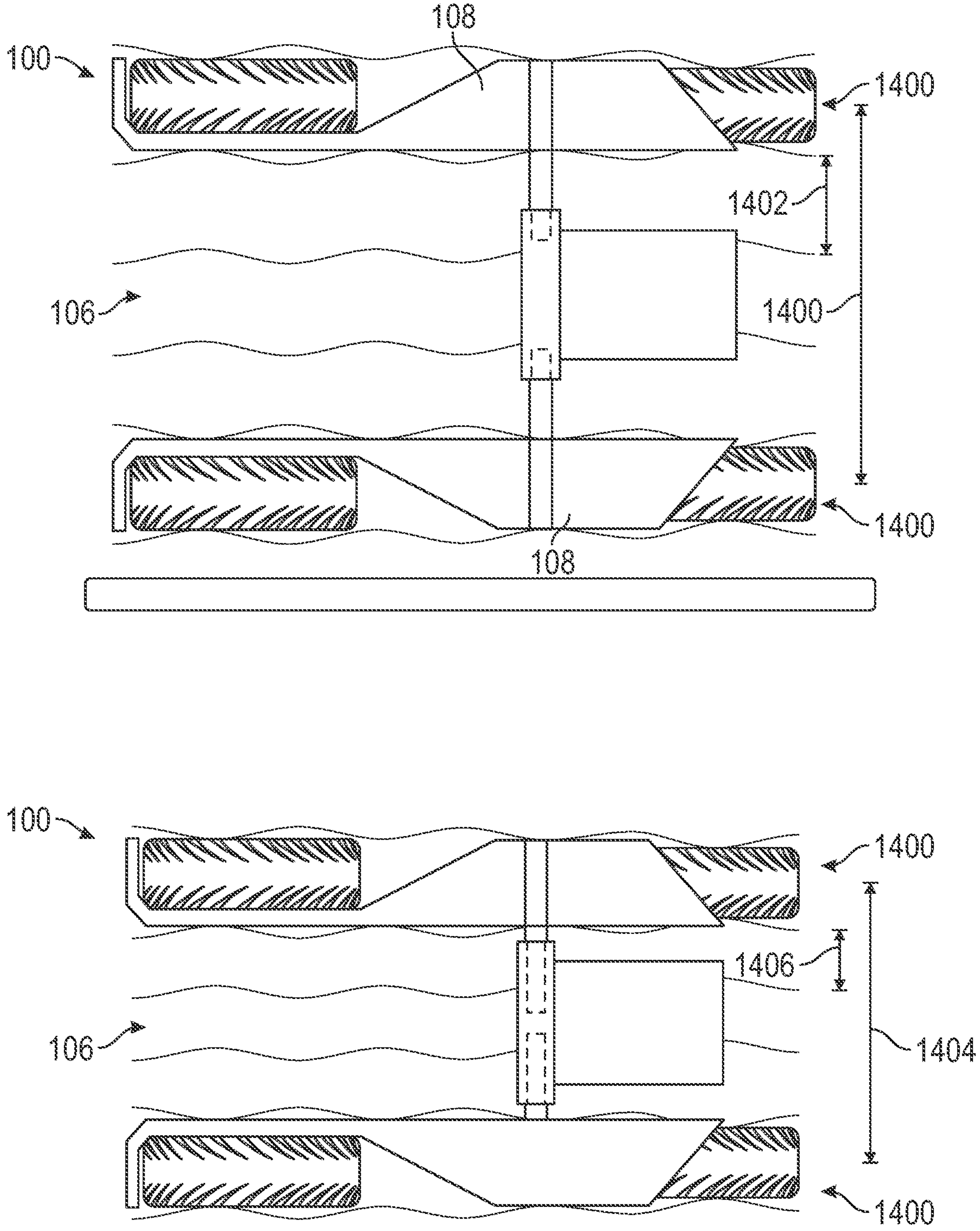
FIG. 14 is a plan view of fields having different row spacing with the implement operating apparatus operating in the fields.

FIG. 14 is a plan view of fields having different row spacing with the implement operating apparatus 100 operating in the fields. FIG. 14 shows the ground engaging elements 114 with specified element spacings corresponding to the crop row spacings where the implement operating apparatus 100 is operating. For instance, the ground engaging elements 114 have a first specified element spacing 1400. The conversion assembly 102 configures the apparatus 100, the component frame members 108 and the ground engaging elements 114 to provide the first specified element spacing 1400. In an example, the ground engaging elements 114 have the first specified element spacing 1400 in correspondence with a first crop row spacing 1402. For instance, the first specified element spacing 1400 is a multiple of the first crop row spacing 1402 that positions the ground engagement elements 114 between crop rows (the substantially horizontal lines in FIG. 14).

In another example, the ground engaging elements 114 have a second specified element spacing 1404 in correspondence with a second crop row spacing 1406. For instance, the spacing 1404 is based on, or is a multiple of, the crop row spacing 1406. The conversion assembly 102 configures the apparatus 100 and the component frame members 108 to provide the second specified element spacing 1404.

In yet another example, the conversion assembly 102 configures the implement operating apparatus 100 with the first specified element spacing 1400 in correspondence with the adjustable implement socket 106 having the second socket profile 1102 (shown in FIG. 11A). Accordingly, the conversion assembly 102 configures the implement operating apparatus 100 with the second specified element spacing 1402 (in FIG. 14) in correspondence with the adjustable implement socket 106 having the first socket profile 1102 (shown in FIG. 11A).

Figure 15:
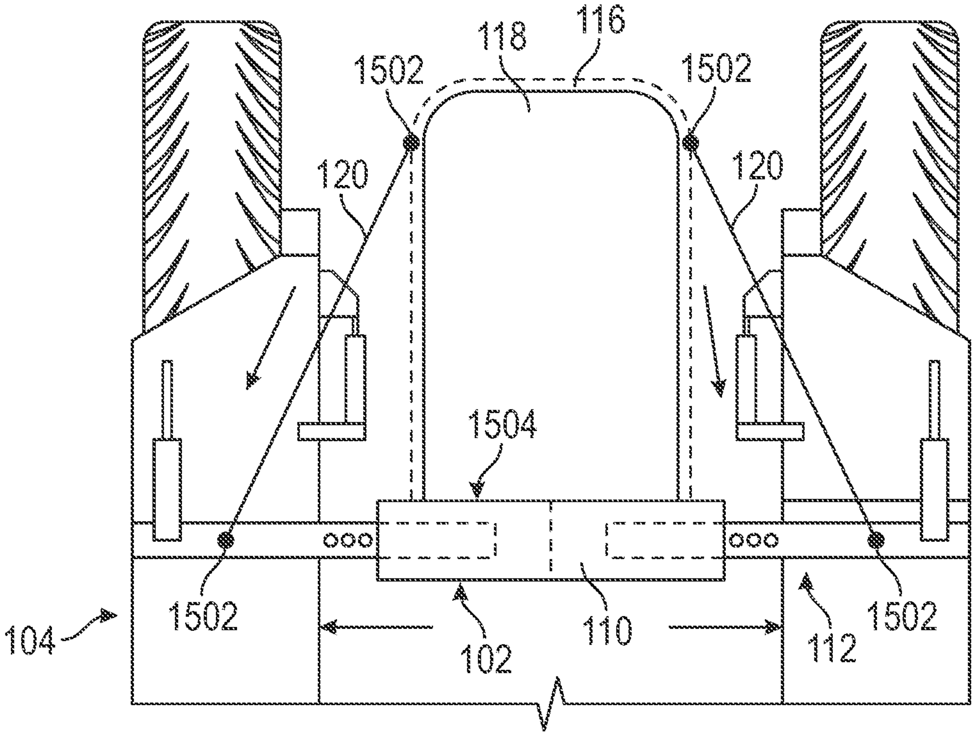
FIG. 15 is a plan view of one example of a carriage suspension assembly.

FIG. 15 is a plan view of one example of a carriage suspension assembly 1500. In one example, the suspension assembly 1500 includes one or more of the carriage tether 120 coupled between the carriage 116 and the frame 104 (e.g., in an ascending angle, or the like). Optionally, the conversion assembly 102 is operated to tension the carriage tether 120 and apply a counter moment to the carriage 116 for support. In another example, the carriage tether 120 is tensioned to minimize twisting moments on frame members, such as the base frame member 110. Accordingly, the carriage tether 120 facilitates support of the carriage 116 and minimizes twisting of the base frame member 110 or the conversion assembly 102. Optionally, the force provided by the conversion assembly is maintained after achieving a specified implement socket profile e.g., the profile 1100 (shown in FIG. 11). The continued application of the force is transmitted along the carriage tether 120 and supports the carriage and its associated load (e.g., the power source 118, payload, equipment, or the like). The associated load of the carriage 116 is accordingly distributed to the component frame members 108 through the carriage tether 120, conversion member 112, or the like. Thus, twisting moments otherwise applied to the base frame member 110 are minimized by the carriage suspension assembly 1500.

In another example, the carriage suspension assembly 1500 includes one or more tether anchors 1502. The tether anchors facilitate coupling of the carriage tether 120 with components of the implement operating apparatus 100. For instance, the carriage tether 120 extends between tether anchors 120 associated with the carriage 120 to tether anchors 120 associated with the frame 104. In an example, the tether anchor is included in the conversion members 112, and the tether 120 extend between the carriage 116 and the conversion members 112.

In yet another example, the carriage 116 is coupled with the frame 104 at a carriage joint 1504. The carriage joint 1504 can include a static joint (with the carriage 116 cantilevered from the frame 104) or a pivoting joint. In an example, the carriage joint 1504 is a pivoting joint, and the joint 1504 is optionally supported with one or more flanged support members, or the like. In another example, the joint 1504 is subject to loads during operation of the implement operating apparatus 100. The conversion assembly 102 (e.g., conversion actuator 200, shown in FIG. 2) provides a force to the carriage tether 120 to pull the carriage 116 and relieve the support members of some of the load of the carriage 116 (including dynamic loads during movement of the apparatus 100).

Figure 16A:
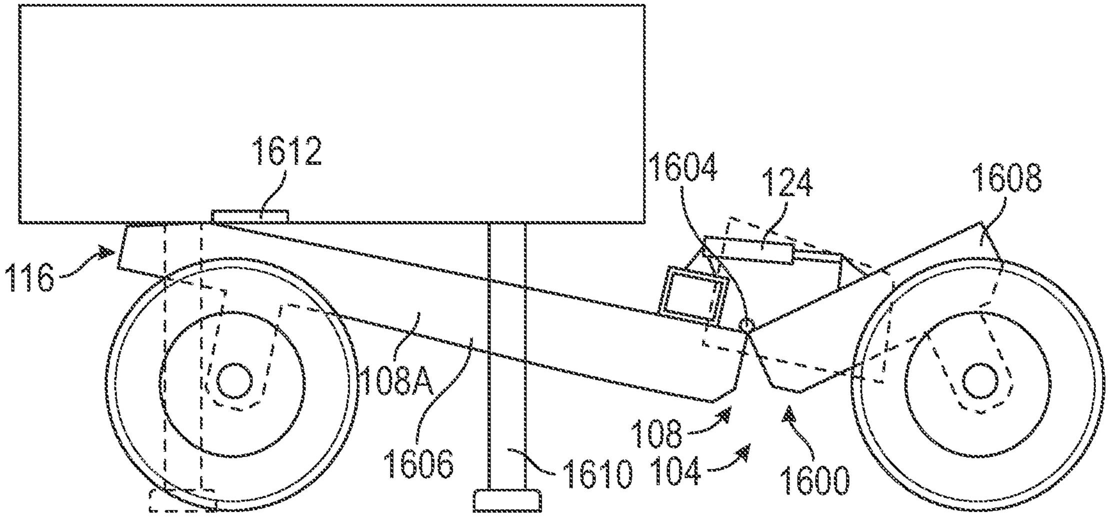
FIG. 16A is a side view of one example of an implement operating apparatus in an unloaded configuration.

FIG. 16A is a side view of one example of an implement operating apparatus 100 in an unloaded configuration. In an example, the implement operating apparatus 100 has an articulating assembly 1600 that facilitates transformation of the frame 104 between a loaded configuration and an unloaded configuration. In the unloaded configuration, the component frame members 108 are articulated into a depressed position to facilitate reception of an implement 1602 and minimizing collisions with the apparatus 100 as the implement 1602 is received in the implement socket 116. In the loaded configuration, the component frame members 108 are in an elevated position relative to the unloaded configuration to couple with (e.g., engage) the implement 1602 and support the implement 1602.

For example, the articulating assembly 1600 includes an articulating frame joint 1604. For instance, a first frame element 1606 is interconnected with a second frame element 1608 at the articulating frame joint 1604. The first frame element 1606 and the second frame element 1608 are included in the same component frame member 108A. The articulating frame joint 1604 cooperates with the frame actuator 124 to facilitate one or more of articulating the frame for loading and unloading an implement or providing suspension to the frame including suspension of an attached implement 1302. In an example, the frame actuator 124 articulates the frame 104 at the frame joint 1604, for instance to allow the first frame element 1606 and the second frame element 1608 to descend. In another example, the frame actuator 124 articulates the frame 104 at the frame joint 1604, for instance to elevate the first frame element 1606 and the second frame element 1608. In yet another example, the frame actuator 124 facilitates suspension (e.g., shock absorption, or the like) for the frame 104.

Figure 16B:
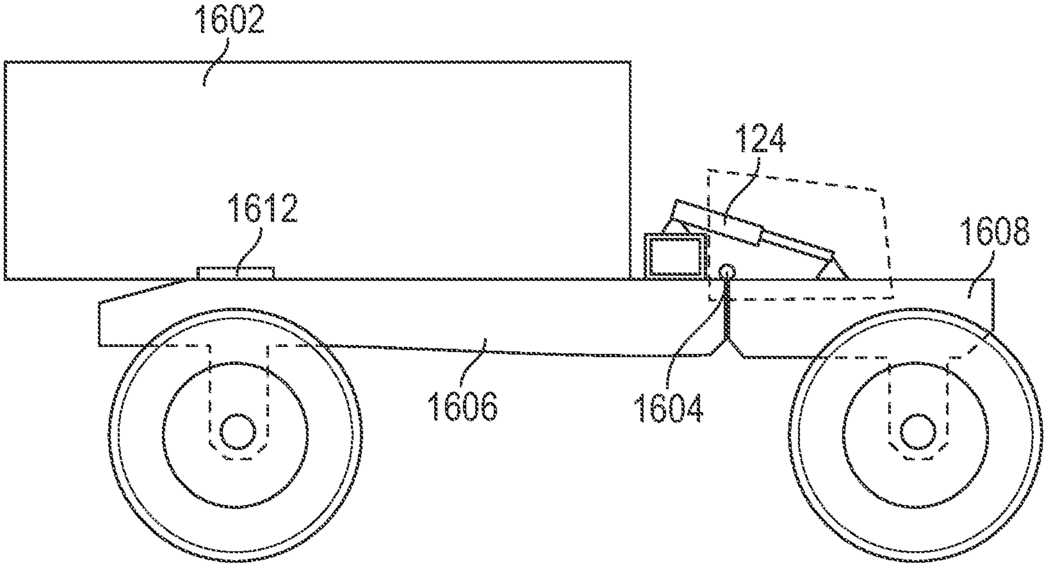
FIG. 16B is a side view of the implement operating apparatus of FIG. 16A in a loaded configuration.

FIG. 16B is a side view of the implement operating apparatus of FIG. 16A in a loaded configuration. For example, the frame actuator 124 cooperates with the frame 124 to articulate the frame 104 (at the frame joint 1604) into the loaded configuration (in contrast to the unloaded configuration shown in FIG. 16A). In an example, FIG. 16B shows the first frame element 1606 and the second frame element 1608 in an elevated position (relative to the depressed position shown in FIG. 16A). Accordingly, the frame elements 1606, 1608 engage with implement and raise the implement off the implement supports 1610 (shown in FIG. 16A).

As described herein, the frame actuator 124 articulates the frame at the frame joint 1604 or facilitates suspension for the frame 104. As shown, the frame actuator 124 elevates (FIG. 16B) or depresses (FIG. 16A) the frame elements 1606, 1608 with the ground engaging elements 114 acting as pivots. The implement 1602 is readily received in the implement socket 106 in an unloaded configuration with the frame depressed and positioned away from the implement 1602 (FIG. 16A). The frame 104 is articulated (using the articulation assembly 1600) into the loaded configuration, for instance by elevating the frame elements 1606, 1608 at the frame joint 1604. Accordingly, the component frame members 108 engage with the implement 1602. Optionally, a support member 1612 of the implement 1602 is coupled across the component frame members 108 to brace the frame members 108 in the loaded configuration. In another example, the frame actuator 124 is operated in the manner of a suspension element (e.g., a shock absorber, or the like) during movement of the implement operating apparatus 100. For instance, the component frame members 108 deflects at the articulating frame joint 1604 and the frame actuator 124 absorbs dynamic loads experienced by the ground engaging elements 114 and transmitted through the frame 104 (and experienced at the articulating frame joint 1604 as relative movement of the frame elements 1606, 1608).

Figure 17:
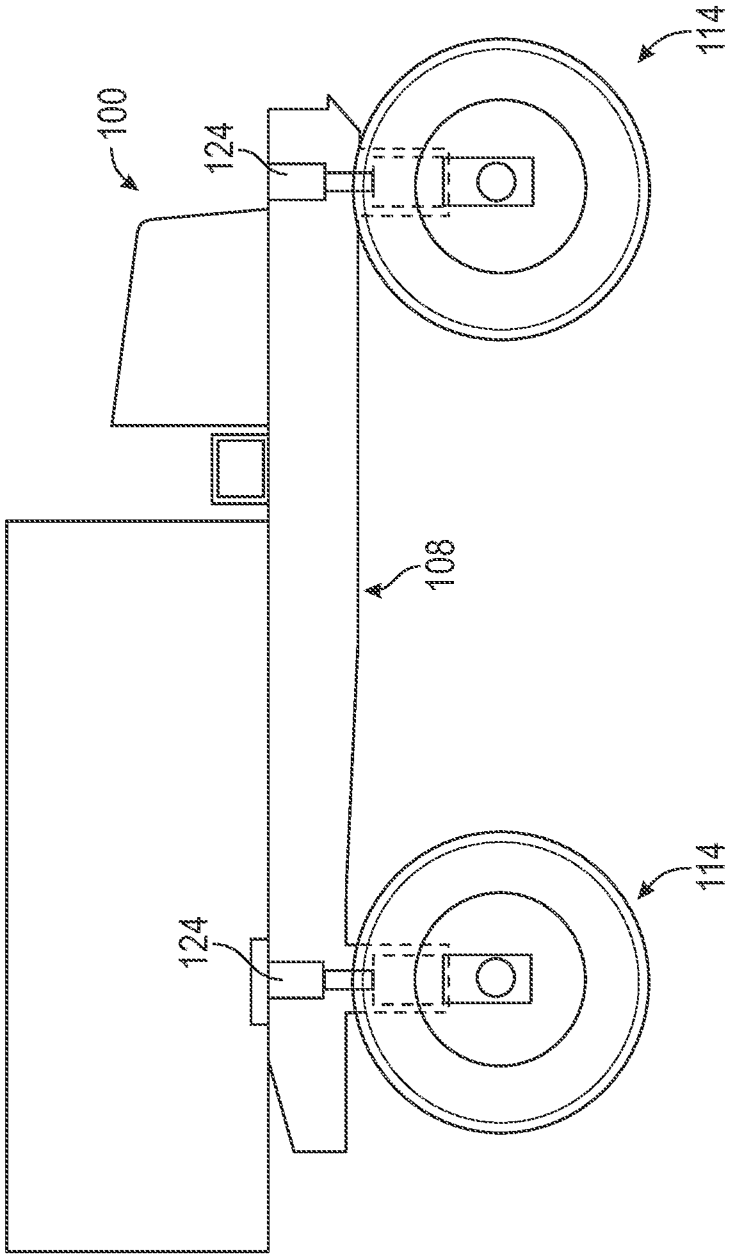
FIG. 17 is a side view of another example of an implement operating apparatus including elevation control actuators.

FIG. 17 is a side view of another example of an implement operating apparatus 100 including elevation control actuators. In this example, the frame actuators 124 are coupled proximate to the ground engaging elements 114. For instance, frame actuators 124 are provided with the ground engaging elements 114. The frame actuators 124 lower and raise the component frame members 108, for example to facilitate reception and coupling with an implement 1700, and decoupling of the implement 1700 from the frame 104.

In an example, a hydraulic cylinder (an example of a frame actuator) includes directional flow control valves to permit elevation control of the frame members 108 and the implement socket 106. In other examples, the frame actuators also provide suspension elements for the implement operating apparatus 100. Accordingly, shock loads are absorbed with the frame actuators 124, uneven terrain is readily navigated with the frame actuators, the frame actuators 124 level the apparatus 100 on uneven terrain or the like. Optionally, the frame actuators 124 include hydraulic cylinders or hydraulic cylinders in combination with an accumulator, hydraulic cylinder in combination with a biasing element (e.g., coil spring, leaf spring, or the like) or the like to provide damped suspension functionality to absorb shock loads. In still other examples, the frame actuator 124 includes a variable flow control orifice to provide variable damping coefficients and corresponding suspension profiles. In other examples, the frame actuators associated with the ground engaging elements 114 facilitate compact storage of the implement operating apparatus 100, for instance for rail or truck shipping, storage when not in use, or the like.

Figure 18A:
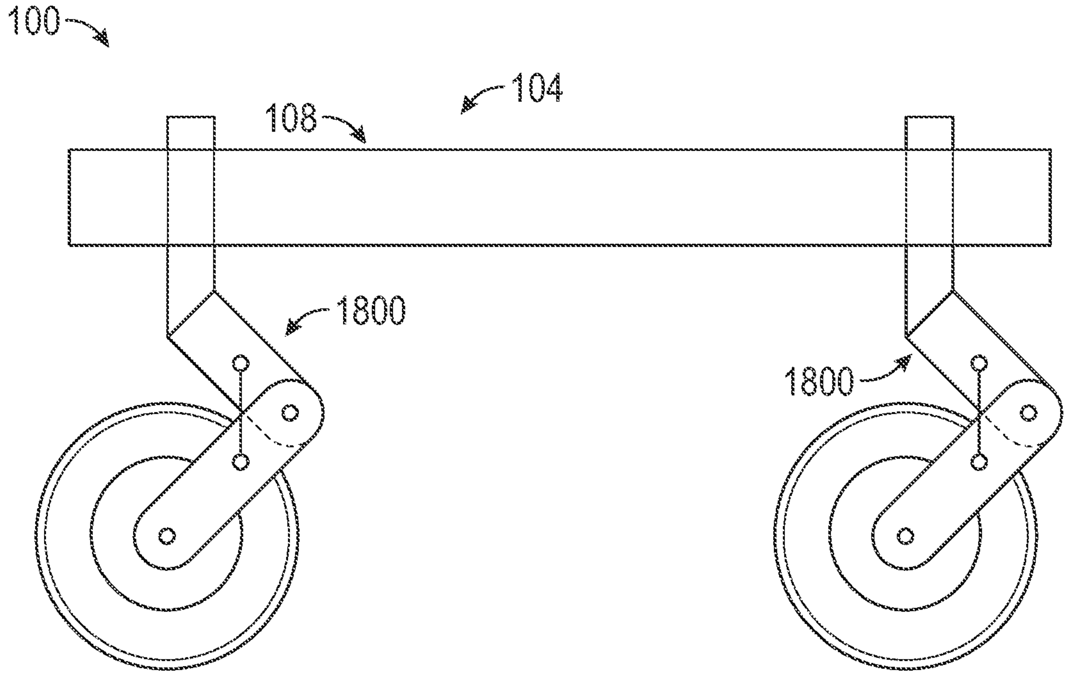
FIG. 18A is a side view of an additional example of an implement operating apparatus including elevation control actuators and strut mechanisms.

FIG. 18A is a side view of an additional example of an implement operating apparatus 100 including elevation control actuators and strut mechanisms. For example, a strut mechanism 1800 extends between a component frame member 108 of the frame 104 and the ground engaging elements 114. The strut mechanism 1800 includes a plurality of elements pivotally coupled with each other (e.g., in a linkage) to permit elevation control of the frame 104 relative to the ground engaging elements 114.

Figure 18B:
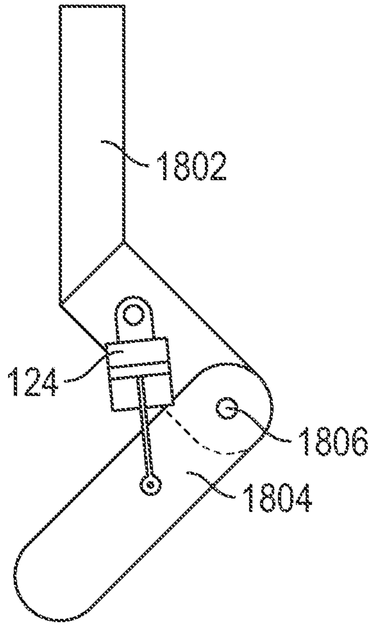
FIG. 18B is a side view of the implement operating apparatus of FIG. 18A including an elevation control actuator and strut mechanism.

FIG. 18B is a side view of the implement operating apparatus of FIG. 18A including an elevation control actuator and strut mechanism 1800. For instance, the strut mechanism 1800 includes a first strut 1802 and a second strut 1804. In an example, the first strut is moveably coupled with the second strut 1804 at a pivot 1806. Optionally, the frame actuator 124 extends between the first strut 1802 and the second strut 1804. For instance, the frame actuator 124 expands and unfolds the strut mechanism 1800 and causes the frame 104 (shown in FIG. 18A) to elevate (e.g., for coupling with an implement within the implement socket 106). Conversely, contraction of the frame actuator 124 folds the strut mechanism 1800 and causes the frame to descend (e.g., to permit movement of the frame 104 around the implement for loading or unloading).

In still other examples, in operation the frame actuator 124 facilitate the positioning of the implement operating apparatus and an installed implement, for instance at a specified crop height, to provide a specified clearance (for underlying crops, overhead obstacles) or the like. Optionally, the frame actuator 124 is operated as a suspension element in addition to controlling height, elevation, descent, or the like. For instance, an accumulator is selectively in communication with the frame actuator 124 to permit operation of the actuator 124 as a suspension element.

VARIOUS NOTES & ASPECTS

Example 1 is an implement operating apparatus comprising: a frame configured for coupling with an agricultural implement, the frame includes: one or more frame members; an adjustable implement socket configured to receive and couple with the agricultural implement; and a conversion assembly configured to transition the adjustable implement socket between a plurality of socket profiles; a plurality of ground engaging elements coupled with the frame; a power source coupled with the frame, the power source in communication with one or more of the ground engaging elements of the plurality of ground engaging elements; and wherein the adjustable implement socket is configured to transition between at least first and second socket profiles of the plurality of socket profiles with the conversion assembly: in the first socket profile the adjustable implement socket is configured to receive and couple with a first agricultural implement having a first implement profile; and in the second socket profile the adjustable implement socket is configured to receive and couple with a second agricultural implement having a second implement profile different than the first implement profile.

In Example 2, the subject matter of Example 1 optionally includes wherein the adjustable implement socket in one or more of the first or second socket profiles is configured to enclose portions of the first or second agricultural implements.

In Example 3, the subject matter of any one or more of Examples 1-2 optionally include wherein the adjustable implement socket in one or more of the first or second socket profiles is configured to extend around portions of the first or second agricultural implements.

In Example 4, the subject matter of any one or more of Examples 1-3 optionally include one or more of the agricultural implement, first agricultural implement or the second agricultural implement.

In Example 5, the subject matter of any one or more of Examples 1-4 optionally include wherein the conversion assembly includes: a base member; a conversion member; and a conversion actuator coupled between the base member and the conversion member.

In Example 6, the subject matter of Example 5 optionally includes wherein the conversion member is telescopically coupled with the base member.

In Example 7, the subject matter of any one or more of Examples 5-6 optionally include wherein the conversion actuator is within at least one of the base member or the conversion member.

In Example 8, the subject matter of any one or more of Examples 1-7 optionally include wherein the one or more frame members include first and second component frame members, and the adjustable implement socket includes the first and second component frame members; and in the first socket profile the first and second component frame members and ground engaging elements, of the plurality of ground engaging elements, associated with the first and second component frame members are separated by a first element spacing; and in the second socket profile the first and second component frame members and the respective ground engaging elements are separated by a second element spacing different from the first element spacing.

In Example 9, the subject matter of Example 8 optionally includes wherein the first component frame member includes at least two ground engaging elements of the plurality of ground engaging elements, and the second component frame member includes at least two different ground engaging elements of the plurality of ground engaging elements.

In Example 10, the subject matter of any one or more of Examples 8-9 optionally include wherein the adjustable implement socket includes a base frame member coupled between the first and second component frame members, and the base frame member includes the adjustment assembly.

In Example 11, the subject matter of any one or more of Examples 1-10 optionally include wherein the one or more frame members include first and second component frame members, and each of the first and second component frame members include at least two frame elements, respectively.

In Example 12, the subject matter of Example 11 optionally includes an articulating assembly including: an articulating frame joint coupled between the frame elements of the first and second component frame members; and a frame actuator coupled between the frame elements of the first and second component frame members, the frame actuator is configured to articulate the frame elements of the first and second component frame members.

In Example 13, the subject matter of Example 12 optionally includes wherein the articulating assembly is configured to transition the adjustable implement socket between unloaded and loaded configurations: in the unloaded configuration the frame elements of the first and second component frame members proximate to the articulating frame joint are depressed and configured for spacing from the agricultural implement; and in the loaded configuration the frame elements of the first and second component frame members proximate to the articulating frame joint are elevated relative to the unloaded configuration and the adjustable implement socket is configured for engagement with the agricultural implement.

In Example 14, the subject matter of any one or more of Examples 12-13 optionally include wherein the articulating assembly is configured to support the implement operating apparatus with one or more of passive or active suspension including articulation at the articulating frame joint and the application of counter moments to the frame elements of the first and second frame components.

In Example 15, the subject matter of any one or more of Examples 1-14 optionally include a carriage suspension assembly including: a carriage coupled with a frame member of the one or more frame members; at least one carriage tether extending from the carriage to an other frame member of the one or more frame members; a conversion actuator of the conversion assembly interposed between the frame member and the other frame member; and wherein the conversion actuator is configured to bias the frame member away from the other frame member and apply corresponding tension along the at least one carriage tether to support the carriage.

In Example 16, the subject matter of Example 15 optionally includes wherein the carriage is coupled to the frame member with a carriage joint, and the carriage is pivotable relative to the frame member.

In Example 17, the subject matter of any one or more of Examples 15-16 optionally include wherein the carriage is coupled to the frame member with a carriage joint, and the carriage is cantilevered relative to the frame member.

In Example 18, the subject matter of any one or more of Examples 15-17 optionally include wherein the at least one carriage tether has an ascending angle from the carriage to the other frame member.

In Example 19, the subject matter of any one or more of Examples 15-18 optionally include wherein the frame member includes a first or second component frame member coupled with one or more ground engaging elements of the plurality of ground engaging elements.

In Example 20, the subject matter of any one or more of Examples 14-19 optionally include wherein the power source includes the carriage.

Example 21 is an implement operating apparatus comprising: an adjustable frame configured for coupling with an agricultural implement, the adjustable frame includes: first and second component frame members movable relative to each other; and an adjustable implement socket configured to receive and couple with the agricultural implement; and a plurality of ground engaging elements including at least first and second ground engaging elements coupled with the first or second component frame members, respectively; a conversion assembly coupled between the first and second component frame members, the conversion assembly includes: a conversion actuator coupled between the first and second component frame members; and wherein the conversion assembly is configured to transition the first and second component frame members between a plurality of frame profiles having specified element spacings between the first and second ground engaging elements; and wherein the conversion assembly is configured to transition the adjustable implement socket between a plurality of socket profiles configured for reception and coupling with a plurality of respective agricultural implements.

In Example 22, the subject matter of Example 21 optionally includes wherein the adjustable implement socket includes the first and second component frame members; and wherein the conversion assembly is configured to transition the first and second component frame members and the adjustable implement socket together.

In Example 23, the subject matter of any one or more of Examples 21-22 optionally include wherein the first component frame member includes the first ground engaging element and a third ground engaging element, and the second component frame member includes the second ground engaging element and a fourth ground engaging element.

In Example 24, the subject matter of any one or more of Examples 21-23 optionally include wherein the adjustable frame includes a base frame member coupled between the first and second component frame members, and the base frame member includes the conversion assembly.

In Example 25, the subject matter of any one or more of Examples 21-24 optionally include wherein the adjustable implement socket is configured to enclose portions of the agricultural implements.

In Example 26, the subject matter of any one or more of Examples 21-25 optionally include wherein the adjustable implement socket is configured to extend around portions of the agricultural implements.

In Example 27, the subject matter of any one or more of Examples 21-26 optionally include one or more agricultural implements of the plurality of agricultural implements.

In Example 28, the subject matter of any one or more of Examples 21-27 optionally include wherein the conversion assembly includes a base member and a conversion member telescopically coupled with the base member; and the conversion actuator is coupled between the base member and the conversion member.

In Example 29, the subject matter of Example 28 optionally includes wherein the conversion actuator is within at least one of the base member or the conversion member.

In Example 30, the subject matter of any one or more of Examples 21-29 optionally include wherein the specified element spacings include at least first and second element spacings, and the conversion assembly is configured to transition the first and second component frame members and the associated first and second ground engaging elements between at least the first and second element spacings corresponding to respective first and second crop row dimensions.

In Example 31, the subject matter of any one or more of Examples 21-30 optionally include wherein the plurality of socket profiles include at least first and second socket profiles; the adjustable implement socket in the first socket profile is configured for reception of a first implement having a complementary first implement profile; and the adjustable implement socket in the second socket profile is configured for reception of a second implement having a complementary second implement profile.

In Example 32, the subject matter of any one or more of Examples 21-31 optionally include wherein the first and second component frame members are aligned with the respective first and second ground engaging elements in each of the plurality of frame profiles.

In Example 33, the subject matter of Example 32 optionally includes wherein alignment of the first and second component frame members with the respective first and second ground engaging elements includes gravity vectors of the first and second component frame members extending through the first and second engaging elements.

In Example 34, the subject matter of any one or more of Examples 21-33 optionally include wherein each of the first and second component frame members include at least two frame elements, respectively.

In Example 35, the subject matter of Example 34 optionally includes an articulating assembly including: an articulating frame joint coupled between the frame elements of the first and second component frame members; and a frame actuator coupled between the frame elements of the first and second component frame members, the frame actuator is configured to articulate the frame elements of the first and second component frame members.

In Example 36, the subject matter of Example 35 optionally includes wherein the articulating assembly is configured to transition the adjustable implement socket between unloaded and loaded configurations: in the unloaded configuration the frame elements of the first and second component frame members proximate to the articulating frame joint are depressed and configured for spacing from the agricultural implement; and in the loaded configuration the frame elements of the first and second component frame members proximate to the articulating frame joint are elevated relative to the unloaded configuration and the adjustable implement socket is configured for engagement with the agricultural implement.

In Example 37, the subject matter of any one or more of Examples 35-36 optionally include wherein the articulating assembly is configured to support the implement operating apparatus with one or more of passive or active suspension including articulation at the articulating frame joint and the application of counter moments to the frame elements of the first and second frame components.

In Example 38, the subject matter of any one or more of Examples 21-37 optionally include a carriage suspension assembly including: a carriage coupled with a frame member of the adjustable frame; at least one carriage tether extending from the carriage to an other frame member of the adjustable frame; a conversion actuator of the conversion assembly interposed between the frame member and the other frame member; and wherein the conversion actuator is configured to bias the frame member away from the other frame member and apply corresponding tension along the at least one carriage tether to support the carriage.

In Example 39, the subject matter of Example 38 optionally includes wherein the carriage is coupled to the frame member with a carriage joint, and the carriage is pivotable relative to the frame member.

In Example 40, the subject matter of any one or more of Examples 38-39 optionally include wherein the carriage is coupled to the frame member with a carriage joint, and the carriage is cantilevered relative to the frame member.

In Example 41, the subject matter of any one or more of Examples 38-40 optionally include wherein the at least one carriage tether has an ascending angle from the carriage to the other frame member.

In Example 42, the subject matter of any one or more of Examples 38-41 optionally include wherein the first or second component frame member includes the frame member.

In Example 43, the subject matter of any one or more of Examples 38-42 optionally include wherein the power source includes the carriage.

Example 44 is a method of using an implement operating apparatus comprising: moving the implement operating apparatus toward an agricultural implement having an implement profile; configuring the implement operating apparatus for one or more of coupling with the agricultural implement or operation in a field having a specified crop row spacing, configuring includes: obtaining one or more of the implement profile or the specified crop row spacing; and one or more of: converting an adjustable implement socket to a socket profile complementary to the implement profile of the agricultural implement; or converting an adjustable frame of the implement operating apparatus to a frame profile having a specified element spacing of ground engaging elements corresponding to the specified crop row spacing; receiving the agricultural implement within the adjustable implement socket; and engaging the adjustable implement socket having the socket profile to the agricultural implement having the complementary implement profile.

In Example 45, the subject matter of Example 44 optionally includes wherein configuring the implement operating apparatus occurs with moving the implement operating apparatus toward the agricultural implement.

In Example 46, the subject matter of any one or more of Examples 44-45 optionally include wherein converting the adjustable implement socket includes operating a conversion assembly to expand or contract the adjustable implement socket to the socket profile corresponding to the implement profile.

In Example 47, the subject matter of any one or more of Examples 44-46 optionally include wherein converting the adjustable implement socket includes moving first and second component frame members of the adjustable frame with a conversion assembly.

In Example 48, the subject matter of any one or more of Examples 44-47 optionally include wherein converting the adjustable frame includes operating a conversion assembly to expand or contract first and second component frame members of the adjustable frame, each of the first and second component frame members coupled with respective ground engaging elements.

In Example 49, the subject matter of Example 48 optionally includes wherein the first component frame member is coupled with first and third ground engaging elements, and the second component frame member is coupled with second and fourth ground engaging elements.

In Example 50, the subject matter of any one or more of Examples 44-49 optionally include wherein engaging the adjustable implement socket includes attaching the agricultural implement with the adjustable implement socket with a latch mechanism.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods.

The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An implement operating apparatus comprising:

a frame configured for coupling with an agricultural implement, the frame includes:
- one or more frame members;
- an adjustable implement socket configured to receive and couple with the agricultural implement; and
- a conversion assembly configured to transition the adjustable implement socket between a plurality of socket profiles;

a plurality of ground engaging elements coupled with the frame;

a power source coupled with the frame, the power source in communication with one or more ground engaging elements of the plurality of ground engaging elements; and wherein the adjustable implement socket is configured to transition between at least first and second socket profiles of the plurality of socket profiles with the conversion assembly:
- in the first socket profile the adjustable implement socket is configured to receive and couple with a first agricultural implement having a first implement profile; and
- in the second socket profile the adjustable implement socket is configured to receive and couple with a second agricultural implement having a second implement profile different than the first implement profile.

2. The implement operating apparatus of claim 1, wherein the adjustable implement socket in one or more of the first or second socket profiles is configured to enclose portions of the first or second agricultural implements.

3. The implement operating apparatus of claim 1, wherein the adjustable implement socket in one or more of the first or second socket profiles is configured to extend around portions of the first or second agricultural implements.

4. The implement operating apparatus of claim 1 comprising one or more of the agricultural implement, the first agricultural implement or the second agricultural implement.

5. The implement operating apparatus of claim 1, wherein the conversion assembly includes:
- a base member;
- a conversion member; and
- a conversion actuator coupled between the base member and the conversion member.

6. The implement operating apparatus of claim 5, wherein the conversion member is telescopically coupled with the base member.

7. The implement operating apparatus of claim 5, wherein the conversion actuator is within at least one of the base member or the conversion member.

8. The implement operating apparatus of claim 1, wherein the one or more frame members include first and second component frame members, and the adjustable implement socket includes the first and second component frame members; and
- in the first socket profile the first and second component frame members and the one or more ground engaging elements of the plurality of ground engaging elements, associated with the first and second component frame members are separated by a first element spacing; and
- in the second socket profile the first and second component frame members and the respective ground engaging elements are separated by a second element spacing different from the first element spacing.

9. The implement operating apparatus of claim 8, wherein the first component frame member includes at least two ground engaging elements of the plurality of ground engaging elements, and the second component frame member includes at least two different ground engaging elements of the plurality of ground engaging elements.

10. The implement operating apparatus of claim 8, wherein the adjustable implement socket includes a base frame member coupled between the first and second component frame members, and the base frame member includes the conversion assembly.

11. The implement operating apparatus of claim 1, wherein the one or more frame members include first and second component frame members, and each of the first and second component frame members include at least two frame elements, respectively.

12. The implement operating apparatus of claim 11 comprising an articulating assembly including:
- an articulating frame joint coupled between the frame elements of the first and second component frame members; and
- a frame actuator coupled between the frame elements of the first and second component frame members, the frame actuator is configured to articulate the frame elements of the first and second component frame members.

13. The implement operating apparatus of claim 12, wherein the articulating assembly is configured to transition the adjustable implement socket between unloaded and loaded configurations:

in the unloaded configuration the frame elements of the first and second component frame members proximate to the articulating frame joint are depressed and configured for spacing from the agricultural implement; and in the loaded configuration the frame elements of the first and second component frame members proximate to the articulating frame joint are elevated relative to the unloaded configuration and the adjustable implement socket is configured for engagement with the agricultural implement.

14. The implement operating apparatus of claim 12, wherein the articulating assembly is configured to support the implement operating apparatus with one or more of passive or active suspension including articulation at the articulating frame joint and the application of counter moments to the frame elements of the first and second frame components.

15. The implement operating apparatus of claim 1 comprising a carriage suspension assembly including:

a carriage coupled with a frame member of the one or more frame members;

at least one carriage tether extending from the carriage to an other frame member of the one or more frame members;

a conversion actuator of the conversion assembly interposed between the frame member and the other frame member; and wherein the conversion actuator is configured to bias the frame member away from the other frame member and apply corresponding tension along the at least one carriage tether to support the carriage.

16. The implement operating apparatus of claim 15, wherein the carriage is coupled to the frame member with a carriage joint, and the carriage is pivotable relative to the frame member.

17. The implement operating apparatus of claim 15, wherein the carriage is coupled to the frame member with a carriage joint, and the carriage is cantilevered relative to the frame member.

18. The implement operating apparatus of claim 15, wherein the at least one carriage tether has an ascending angle from the carriage to the other frame member.

19. The implement operating apparatus of claim 15, wherein the frame member includes a first or second component frame member coupled with the one or more ground engaging elements of the plurality of ground engaging elements.

20. The implement operating apparatus of claim 15, wherein the power source includes the carriage.

21. A method of using an implement operating apparatus comprising:

moving the implement operating apparatus toward an agricultural implement having an implement profile;

configuring the implement operating apparatus for one or more of coupling with the agricultural implement or operation in a field having a specified crop row spacing, configuring includes:

obtaining one or more of the implement profile or the specified crop row spacing; and one or more of:

converting, using a conversion assembly, an adjustable implement socket to a socket profile complementary to the implement profile of the agricultural implement; or converting an adjustable frame of the implement operating apparatus to a frame profile having a specified element spacing of ground engaging elements corresponding to the specified crop row spacing;

receiving the agricultural implement within the adjustable implement socket; and engaging the adjustable implement socket having the socket profile to the agricultural implement having the complementary implement profile.

22. The method of claim 21, wherein configuring the implement operating apparatus occurs with moving the implement operating apparatus toward the agricultural implement.

23. The method of claim 21, wherein converting the adjustable implement socket includes operating a conversion assembly to expand or contract the adjustable implement socket to the socket profile corresponding to the implement profile.

24. The method of claim 21, wherein converting the adjustable implement socket includes moving first and second component frame members of the adjustable frame with a conversion assembly.

25. The method of claim 21, wherein converting the adjustable frame includes operating a conversion assembly to expand or contract first and second component frame members of the adjustable frame, each of the first and second component frame members coupled with respective ground engaging elements.

26. The method of claim 25, wherein the first component frame member is coupled with first and third ground engaging elements, and the second component frame member is coupled with second and fourth ground engaging elements.

27. The method of claim 21, wherein engaging the adjustable implement socket includes attaching the agricultural implement with the adjustable implement socket with a latch mechanism.

* * * * *